United States Patent [19]

Bradshaw et al.

[11] 4,385,206

[45] May 24, 1983

[54] PROGRAMMABLE PORT SENSE AND CONTROL SIGNAL PREPROCESSOR FOR A CENTRAL OFFICE SWITCHING SYSTEM

[75] Inventors: Robert H. Bradshaw, Seminole County; Dennis L. Edinger; David L. Hinshaw, both of Longwood; Pedro A. Lenk, Fern Park; Thomas H. McKinney, Altamonte Springs, all of Fla.; Jayantkumar R. Shah, Munich, Fed. Rep. of Germany

[73] Assignee: Stromberg-Carlson Corporation, Longwood, Fla.

[21] Appl. No.: 216,814

[22] Filed: Dec. 16, 1980

[51] Int. Cl.³ .......................... H04J 3/12; H04Q 3/54
[52] U.S. Cl. .............................. 179/18 ES; 370/110.1
[58] Field of Search ....... 179/18 ES, 18 FG, 175.2 C; 370/58, 110.1

[56] References Cited

U.S. PATENT DOCUMENTS

| | | | |
|---|---|---|---|
| 4,074,072 | 2/1978 | Christensen et al. | 370/65 |
| 4,247,740 | 1/1981 | Anderson et al. | 179/18 AH |
| 4,276,451 | 6/1981 | Beebe et al. | 179/175.2 C |
| 4,280,217 | 7/1981 | Hafer et al. | 370/63 |

OTHER PUBLICATIONS

"A Preprocessor for SPC Switching Systems", Winch and Hyde, International Switching Symposium (Munich), Sep. 1974, pp. 147/1-6.

Primary Examiner—Thomas W. Brown

[57] ABSTRACT

A community office switching system includes a three-level hierarchy of distributed processors operating in parallel with one another to control the operation of a central office matrix switch network interconnecting 1,920 ports. At the highest level, a stored-program call control processor controls call progression, establishing paths through the matrix switch network. At the second level, a series of special-purpose, stored-program, port control processors each service 960 ports, sensing and transmitting supervisory signals and communicating the occurrence of significant port events to the call control processor. Each port event control processor dedicates approximately 32 microseconds out of every 32 milliseconds to each of the 960 ports in time-multiplexed fashion, and hence no port can ever be locked out at the port-control-processor level. One from a series of stored programs is executed to service each port precisely one every 32 milliseconds. At the lowest level, a digital filtering processor, associated with each port control processor, samples some signals from each port once every millisecond, filters the sampled signals to give one filtered sample every four milliseconds, and stores the filtered samples for presentation to the associated port control processor once every 32 milliseconds.

33 Claims, 21 Drawing Figures

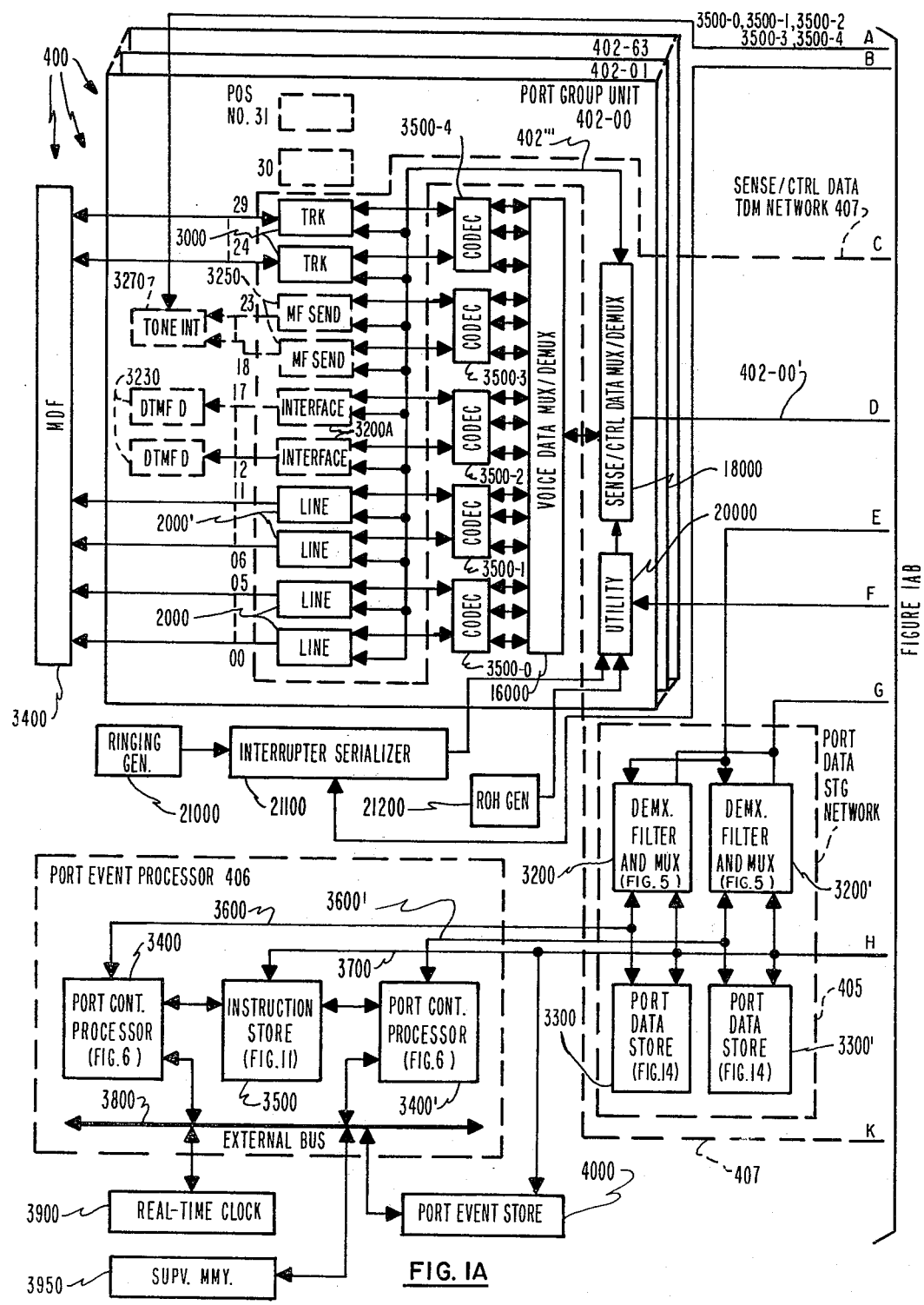
FIG. IA

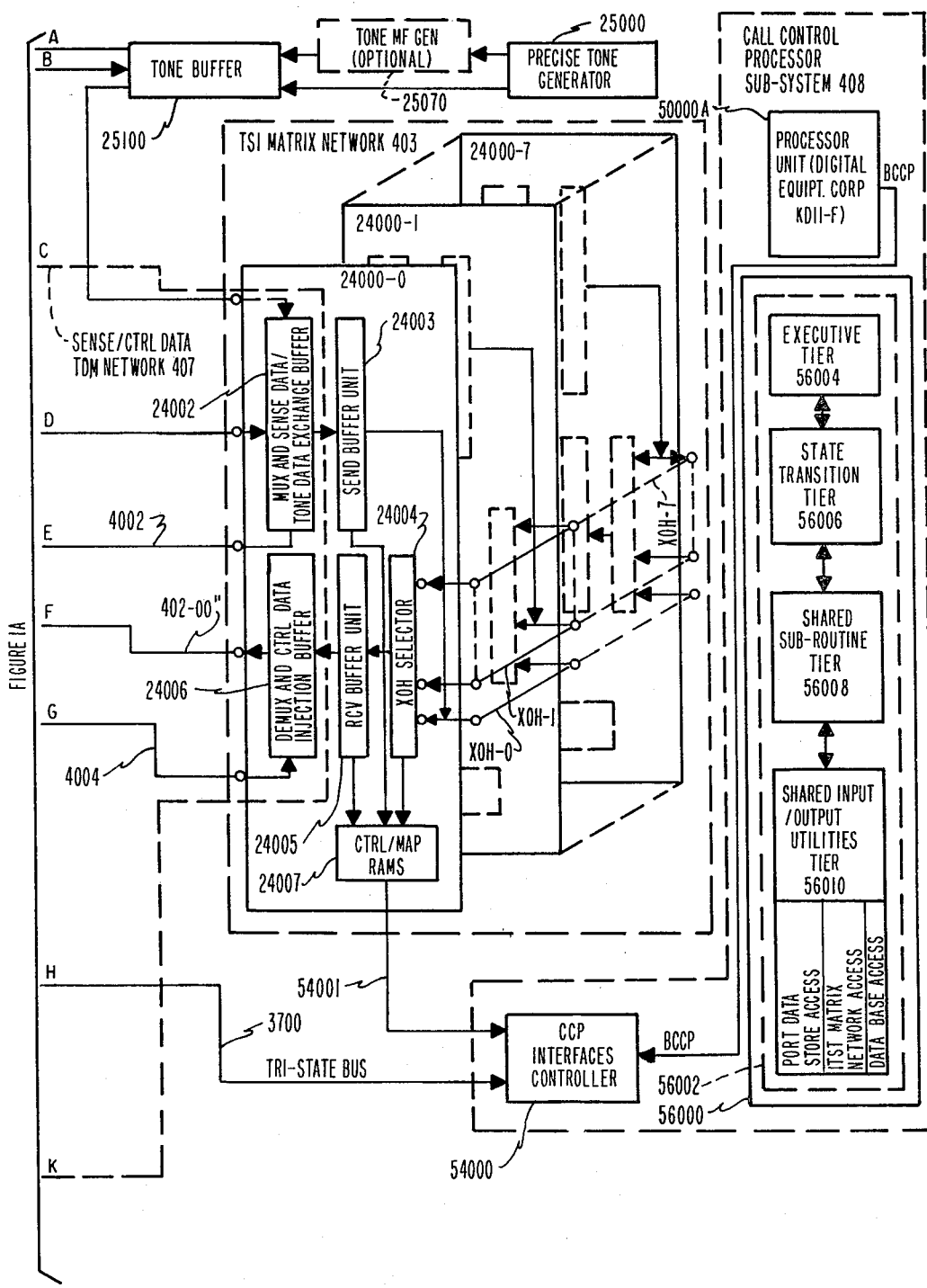
FIG. IAB

PROGRAMMABLE PORT SENSE AND CONTROL SIGNAL PREPROCESSOR FOR A CENTRAL OFFICE SWITCHING SYSTEM

BACKGROUND OF THE INVENTION

1. Field of Invention

This invention relates to a community office switching system in which the uppermost element of its common control hierarchy is a stored program processor. More particularly, it relates to the portions of such a system involved in the sensing and transmitting of supervisory events.

2. Description of the Prior Art

U.S. patent application Ser. No. 924,882 filed on July 14, 1978 by Barrie Brightman, et al., entitled "Arrangement of Interactive Processors for Performing Timing Analyses of Port Events," (abandoned), and superseded by two continuation cases consisting of patent application Ser. No. 63,601 filed Aug. 2, 1979 (abandoned), and patent application Ser. No. 275,072, filed June 18, 1981, discloses a central office switching system that is essentially identical to the present system in many respects. Both the prior system and the present system share a common arrangement of port group units and switching matrix elements and, except in a few details, that system and the present system share a common stored-program call control processor that establishes paths between ports through the switching matrix. The two systems differ in the way they extract port supervisory signals from their respective matrix elements, analyze those signals, communicate the occurrence of significant port events to the call control processor, and transmit control signals back to the individual ports.

More specifically, the prior-art arrangement disclosed in the application Ser. No. 924,882 demultiplexes incoming supervisory signals flowing from the matrix network and stores them in a port data store. A series of hardware logic devices constituting a "combinatorial logic" then cyclically scan the port data store, sampling the sense signals from each port once every four milliseconds. Each time the sense signals from a port are scanned, one of the series of logic devices within the combinatorial logic is selected, depending upon the state of the port, to test the status of the sense signals and to take whatever action is appropriate. The logic devices include a "sense supervisory event/transmit supervisory event" logic unit, a "ring line" logic unit, and "receive digits" logic unit, and a "receive and send digits" logic unit. The "combinatorial logic" that monitors the individual ports is thus a series of nonprogrammable, hard-wired, dedicated logic units each dedicated to a particular function. Because these logic units are not controlled by a sequential processor, they are able to perform parallel operations internally, and they are not slowed down by the need to access stored instructions. They can service all of 1,920 individual ports in four milliseconds, dedicating only about two microseconds to each port during each scanning cycle.

The "combinatorial logic" just described has proved satisfactory in actual service, but this approach to the design of a community office has a number of drawbacks.

In the first place, utilizing a hard-wired logic for this function means that changes in the way individual ports are monitored can only be implemented through hardware modifications involving the redesign of circuit boards and the selection of new logic gates. Accordingly, it is costly to redesign the combinatorial logic for use in telephony systems having different line protocols, and it is also costly to redesign the combinatorial logic to reflect changes in line protocol. Secondly, the four-millisecond port sampling rate, which is necessary to resolve properly rapid fluctuations in the incoming port signals, forces a two-microsecond time limit on the time the combinatorial logic can spend during each four-millisecond time interval with each individual port. Two microseconds is barely long enough to allow rapid, hard-wired-logic processing, and it is far too brief an interval to allow program-controlled processing of the port signals. Even using hard-wired logic, it is difficult to perform some functions in two microseconds, and functions requiring more processing time must be shifted to the programmable call control processor.

One possible solution to the above problems would be to substitute a program-controlled microprocessor for the combinatorial logic, "time-sharing" the microprocessor between the 1,920 ports. Such a substitution would make it simple to reprogram to reflect changes in protocol, since reprogramming would then require only the substitution of a new program for the old one. But program-controlled microprocessors cannot function as fast as can hard-wired logic circuits due to their inability to perform operations in parallel and due to the time that is lost accessing instructions. Additionally, a conventional "time-shared" processor would require several microseconds to transfer from the instruction sequence and data values for one port to the instruction sequence and data values for another port, and this loss of time, spread over 1,920 ports, would amount to several milliseconds of lost time. The use of conventional microprocessors as direct replacements for the combinatorial logic would thus render the system unable to examine each port every four microseconds and unable to handle extremely rapid fluctuations of the port signals. Such microprocessors would necessarily have to operate in an "interrupt" mode, where port events triggered "interrupts" that are serviced sequentially, and then the microprocessors could not respond promptly to large numbers of simultaneous port events. Alternatively, the number of ports serviced by each microprocessor would have to be substantially reduced to well under the 1,920 signals the combinatorial logic can handle, but then many microprocessors would be required to replace each combinatorial logic unit, and the cost and complexity of the community office system would increase substantially.

Even assuming microprocessors could be substituted for the combinatorial logic, creating suitable software for conventional microprocessors operating in a "time-sharing" mode would be difficult, for different ports at different times would require differing amounts of program-execution time. Accordingly, the programs would be executed at irratic times, and program timing functions would have to make frequent reference to external clocks. Alternatively, the programming could perform a sequential series of different functions for all the ports being serviced, as is explained beginning on page 1042 of an article entitled "Peripheral Systems" by Huttenhoff, et al, (56 BELL SYSTEM TECHNICAL J. 1029, 1042 (No. 7, Sept. 1977), but the programs would then be complicated by the need to service many ports, rather than just one, for each function. On page 1045, Huttenhoff notes that his signal processor organization is "similar to that of a stored program processor."

But to achieve the necessary 10-millisecond resolution, Huttenhoff had to resort to "wired logic" rather than a programmed computer (page 1042). Accordingly, using a conventional timesharing system or a conventional software multi-port scanning system, the complexity of the needed software is such that only a minimal number of ports could be serviced by each processor, and the cost of generating special software for special applications, such as to satisfy the protocol conventions in a variety of foreign countries, would be excessive.

Accordingly, a primary object of the present invention is to provide a programmable sense and control signal preprocessor for a central office switching system capable of servicing a large number of ports with adequate speed so that no port events ever go undetected using greatly simplified software that is easy to produce and easy to modify for special applications.

BRIEF SUMMARY OF THE INVENTION

Briefly described, the present invention contemplates providing a stored-program processor that is designed to service the sense and control data for each port in a large group of ports at precisely-spaced periodic intervals that can never vary. In the preferred embodiment of the invention, each processor services each of 690 ports precisely once every 32 milliseconds, dedicating just under 32 microseconds to each port—sufficient time to execute over 100 computational microinstructions, if necessary, while servicing the data for each port. Since the stored microinstruction programs service only one port at a time and are always initiated at precisely-spaced 32 millisecond intervals, the stored programs can be far simpler than comparable programs that must service many ports or that are placed into execution by a conventional "time-sharing" system at uncertain moments in time.

To illustrate the simplicity of these programs, consider the task of detecting an "off-hook" condition, where the condition must last for 64 milliseconds before it is to be acknowledged. With the present invention, three extremely simple programs may be used to perform this task. The first program, which we may call "Program A", is executed every time an "on-hook" port is checked. If the port is still "on-hook", this program terminates, storing its own address with the port data so that Program A will be again executed 32 milliseconds later. But if the port is "off-hook", Program A still terminates but leaves the address of Program B with the port data. 32 milliseconds later, Program B tests to see if the port is "off-hook". If the port is now "on-hook", Program B terminates leaving the address of Program A again with the port data. But if the port is still "off-hook", Program B terminates leaving the address of a third Program C with the port data. 32 milliseconds later (64 milliseconds after the onset of the "off-hook" condition), Program C tests to see if the "off-hook" conditions still persists. If not, Program C terminates, leaving the address of Program A stored with the port data. But if the port is still "off-hook", Program C sends a message to the main call control processor notifying that processor of the "off-hook" condition. Program C then terminates, leaving the address of Program D with the port data. Assumedly, Program D is the first of a similar series of very simple programs that detect dial pulses or other port events.

Note the extreme simplicity of the above programs, each describable in only two or three sentences. This simplicity results from always initiating execution of the programs at evenly-spaced intervals in time and processing the data for only one port each time one of these programs is run. In the preferred embodiment of the invention, these programs do not even know the identity of the port whose data they are processing when they are run. All ports are thus treated exactly alike.

To achieve such simplicity in the programs that service the ports, and to enable a pair of processors to service 1,920 ports in 32 milliseconds, the present invention utilizes a novel stored-program microprocessor having high-speed registers that may be exchanged in a fraction of a microsecond following each 32-microsecond interval. These registers contain the sense and control data for a single port and the address of the program that is to service the port data. After the program has been executed, the program stores the address of the next program that is to be run 32 milliseconds later in one of the registers, and the microprocessor idles until the end of the 32 microsecond interval. The sense and control data for the next port is then swapped into the high-speed registers, and the sense and control data for the port just serviced is stored elsewhere. A program whose address is contained within the data for the next port is then executed. After running to completion, this second program stores in the registers the address of the next program that is to be run in 32 milliseconds, and the processor again idles until the end of the 32 microsecond interval, at which point in time the sense and control data for yet another port is brought into the high-speed registers and processed, and so on.

In the preferred embodiment of the invention, pairs of stored-program microprocessors are arranged to share a common microinstruction store by timing their operations so that one processor is retrieving its next instruction from the instruction store while the other is executing an instruction, and vice versa. In this manner, a single complete set of instructions can service 1,920 ports, half of which are serviced by each of two microprocessors. A similar interleaving arrangement in the preferred embodiment of the invention allows each microprocessor to access and process the data for one port that is stored in a first portion of the microprocessor's high-speed registers while an external port data store, which is given momentary access to a second portion of the same high-speed registers each time the microprocessor is busy retrieving an instruction from the instruction store, removes the processed data for a second port from the second portion of the high-speed registers and loads the unprocessed data for a third port into the same second portion of the high-speed registers. At the end of each 32-microsecond interval, the system master clock simply gives each microprocessor access to the second portion of its high-speed registers, the portion containing the unprocessed port data, and gives the port data store access to the first portion of the high-speed regsters so that the processed port data in the first portion can be unloaded and stored and so that the unprocessed data from a fourth port can be loaded into the first portion of the high-speed registers. After another 32 microseconds, the system master clock again gives the microprocessor access to the first portion and gives the port data store access to the second portion, and so on. In this simple manner, the contents of the high-speed registers are apparently altered in a fraction of a microsecond—far less time than it would take to interrupt a conventional program in a conventional time-sharing or process-control computer.

Conventional microprocessors sequentially retrieve high-level "instructions" from a program memory and use each such high-level "instruction" to initiate the execution of a microcode instruction sequence. In the preferred embodiment of the invention, only a single microcode instruction sequence is executed each time the data for a port is to be processed. The port data contains the address of the microcode instruction sequence that is to process the port data, and the last instruction in the microcode instruction sequence stores within the port data the address of the microcode instruction sequence that is to be executed 32 milliseconds later. Accordingly, the port data itself constitutes a single high-level "instruction" that triggers the execution of a single microcode instructon sequence every 32 milliseconds.

The above features of the invention enable a stored-program, port-control processor to scan all of 960 ports in 32 milliseconds, executing 32 microseconds of microcoded instructions while scanning each individual port, and switching between ports almost instantaneously. In 32 microseconds, over 100 microinstructions may be executed, if necessary.

Since time is dedicated to each port once every 32 milliseconds, the port control processor never takes longer than 32 milliseconds to respond to a port event no matter how many port events occur simultaneously. Altering the operation of the port control processor is achieved simply by altering the microcode instructions stored within it. Thirty-two milliseconds is a fast enough response time to satisfy the most stringent existing requirements for community-office response to a change in port status.

But one sampling every 32 milliseconds is not enough samplings to enable a processor to follow certain port signals that may fluctuate as often as once every two milliseconds—a one-millisecond sampling rate is required. The necessary samples could be captured and stored externally of the port control processor for examination once every 32 milliseconds by the port control processor, but the proper filtering and analysis of 32 such samples would then take up a considerable amount of the processor's time.

Accordingly, the present invention in its preferred embodiment teaches the use of a hardware filtering processor separate from and operating in parallel with each port control processor to sample certain critical port signals once every millisecond, to derive one filtered signal sample from every four adjoining samples, and to present eight filtered samples representing the state of each critical port signal at four-millisecond intervals to the port control processor once every 32 milliseconds for each port. In addition, to avoid any possible resonance between the one-millisecond sampling rate and some external signal, the filtering processor shifts back and forth the time point about which it selects its four adjoining signal samples and thereby effectively introduces an oscillator phase-shift into the one-millisecond sampling frequency that eliminates all possibility of a resonance. The resulting 4-millisecond signal samples are thus accurate and highly immune from both noise and resonance.

Additional objects and advantages of the invention are apparent in the detailed description which follows, in the drawings, and in the claims appended to and forming a part of this description.

BRIEF DESCRIPTION OF THE DRAWING

FIGS. 1A and 1AB (hereinafter sometimes collectively called "FIG. 1A") together form a block diagram of a community office switching system which embodies the present invention;

FIG. 9A illustrates the precise interconnections between the arithmetic logic unit 3432 (FIG. 9) and the pipeline register (FIG. 13);

FIGS. 17A and 17B illustrate how the programmable logic array 16008 is programmed to perform the filtering function in FIG. 16.

I-CONCISE DESCRIPTION OF THE DISCLOSURE

Figure 1B:
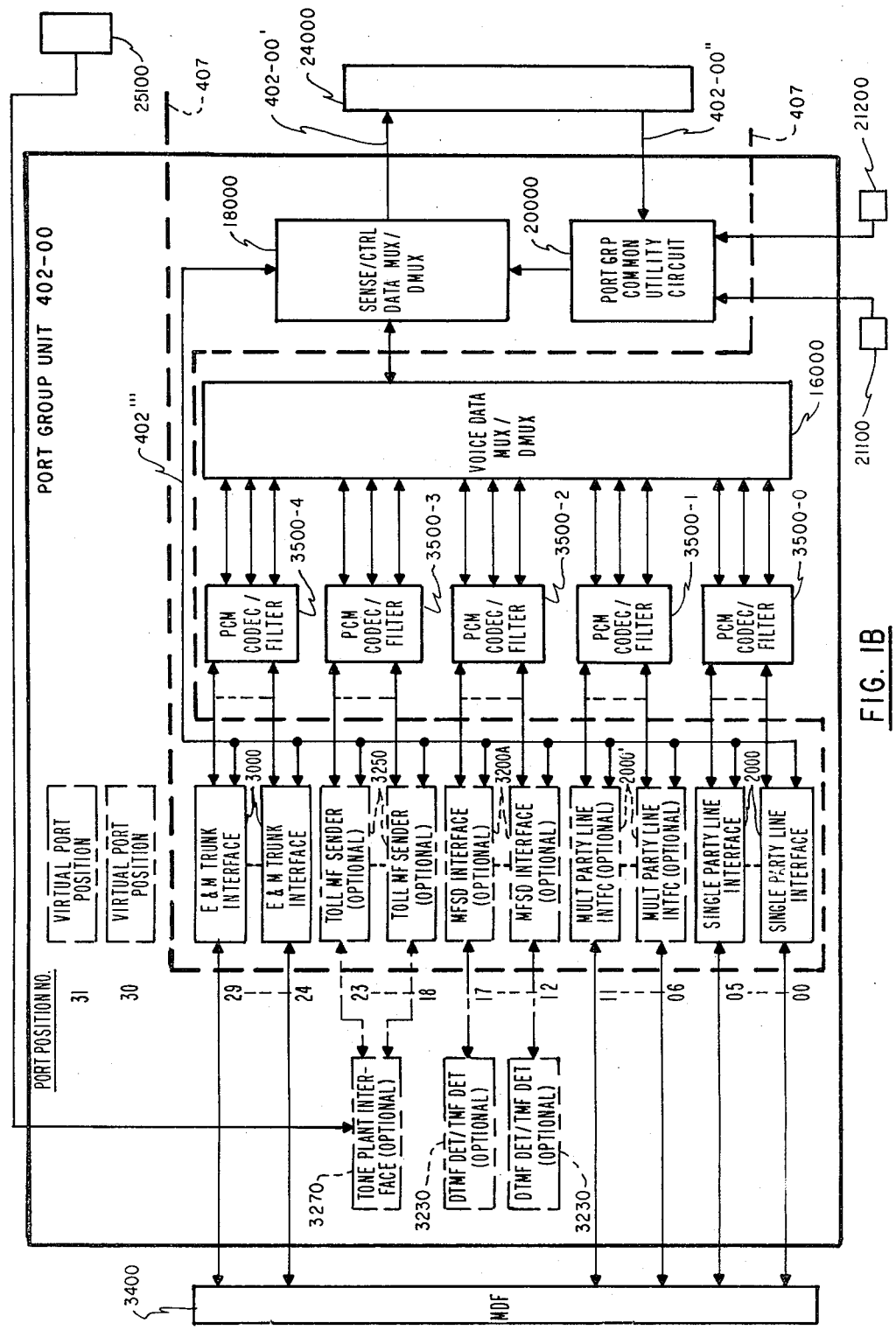
FIG. 1B is an enlargement of a portion of the system of FIG. 1A.

FIGS. 1A and 1AB present an overview block diagram of a community office switching system designed in accordance with the present invention. In this first portion of the detailed description, a complete overview of the entire system is presented to provide the necessary background for the more detailed discussion of the present invention that forms the second portion of this detailed description. Subsections "L" through "N" of this overview also focus particularly upon the present invention.

A. Major System Subdivisions

Referring now to FIGS. 1A and 1AB, the major subdivisions of a central office switching system 400 comprise a plurality of port group units 402; a time slot interchange (TSI) matrix network 403; a port data storage network 405; a port event processor (PEP) 406; a sense and control data time division multiplex (TDM) network 407, and a call control processor (CCP) subsystem 408. The TSI matrix network 403 establishes the line-to-line connections, the trunk to line connections, and other equipment to line to trunk connections which constitute the basic function of the switching system 400. As is apparent from the block diagram of FIGS. 1A and 1AB, overlap exists between these subdivisions. This is because many of the units represented by individual blocks are assemblies of circuits that perform a number of functions. The aforementioned major subdivisions are defined along functional lines, and therfore the overlap exists because the basic block elements perform functions in association with more than one of the functionally defined subdivisions.

B. The Port Group Units

Referring now to FIG. 1A, each port group unit 402 contains circuitry which performs the analog-digital conversion and the multiplexing-demultiplexing operations on the serial time-division-multiplexed streams of binary data which connect each unit 402 to the TSI matrix network 403. The grouping of the incoming and outgoing signals of all the ports within a port group into single streams of incoming and outgoing bits facilitates: (i) the communication of voice data between the ports and the network 403; and (ii) the communication of sense and control data between the ports and the other subdivisions of the system 400.

Sense data, which is communicated in the direction from the port positions to the other subdivisions of the system 400, includes data representing the status of incoming line or trunk supervision signals, or data representing incoming dialing signals, or signals representing the state of relays in circuits installed in the port equipment positions. Data of this type is collectively referred to as "sense" data.

Control data, which is communicated in the direction toward the ports from various subdivisions of system 400, includes low-level signal intelligence for generating outgoing supervision signals on trunks, low-level signal intelligence for generating outgoing dialing signals along trunks, and signals for controlling relays in the circuits installed in the port positions. Data of this type is collectively referred to as "control" data.

The functions and circuits of the port group units 402 which involve sense and control will also be discussed in connection with the description of the sense and control data TDM network 407 in subdivision N, following.

C. Port Equipment Positions

Referring now to FIG. 1B, each port group unit 402 has thirty port equipment positions and two virtual port positions. The port equipment positions in each group are designated 00 through 29. The block diagram of FIG. 1B shows that there are five groups of six port positions each; namely, 00 through 05, 06 through 11, 12 through 17, 18 through 23, and 24 through 29. (The reason that the port positions have been illustrated in such groupings of six is that each group feeds a common PCM CODEC/filter 3500, as will be discussed in subdivision E, following.) The 30th and 31st port equipment positions are virtual port positions. They do not exist as physical equipment positions into which circuits may be installed. Instead, they are virtual positions permitting TDM streams of binary data which have timeslot designations other than the twenty-nine voice data timeslots. These extra timeslots are used for the transmission of sense and control data from and to port group unit common circuitry.

The thirty port equipment positions 00 . . . 29 are universal. That is to say, any of the various types of port equipment used with system 400 may be installed in each port equipment position. To illustrate this universality, the block diagram of FIG. 1B shows five different types of circuits installed in the various groups of positions. Positions 00 . . . 05 contain single party line interface circuits 2000. Positions 06 . . . 11 contain multiparty line interface circuits 2000'. The circuits 2000' are shown as broken line boxes indicating that they are optional. The circuits 2000 and 2000' are connected with the outside telephone facilities through a conventional main distribution frame 3400.

Positions 12 . . . 17 contain multifrequency signal detector interfaces 3200A, also optional. Interfaces 3200 serve to either interface a dual tone multiple frequency (DTMF) detector through the TSI switch network 403, or to interface a toll multifrequency (TMF) detector with a toll port via the TSI matrix network 403. This is shown by the connection of interfaces 3200 to blocks 3230 which diagrammatically represent either a DTMF detector or a TMF detector.

Positions 18 . . . 23 contain toll multifrequency senders 3250, also optional. Senders 3250 receive tones from a tone plant interface 3270, which in turn receives the tones from a tone buffer 25100 (introduced later in subdivision K). The tone buffer 25100 is the output of the tone plant for system 400.

Positions 24 . . . 29 contain E&M trunk interface circuits 3000 which connect to the interoffice trunk facility through main distribution frame 3400.

The variety of interface or service circuits shown as installed in the port group unit 402-00 is a hypothetical selection of circuits selected to illustrate the universality of the port positions. In actual practice, each individual port group unit typically contains only one type of interface or service circuit.

D. Interface Circuits and Service Circuits

Each line interface circuit 2000 is a controlled signal interface between a two-way analog signal on the subscribed side of the circuit and two one-way (4-wire) analog signal paths on the TSI matrix network 403 side of the circuit 2000. Each circuit 2000 also provides controlled conversions of sense and control signals between the metallic path signal system (the high-level signals of the subscriber line) and the low-level binary signals of the sense and control data TDM network 407. The sense and control signals of the network 407 are strobed onto and off of sense and control buses 402''' (FIG. 1B) via latches within the circuit 2000.

Each multiple party line interface circuit 2000' is substantially the same as a single party line interface, except that a multiple-frequency ringing bus having the various parties' ringing frequencies thereon at particular time phases provides the ringing signal. The ringing relay is then selectively controlled to operate during the phase which corresponds to a party's ringing frequency.

Each E&M trunk interface circuit 3000 provides a controlled interface between the system 400 and an interoffice trunk. Each circuit 3000 provides the analog 2-to-4 wire conversion and the sense and control interface between the metallic path signal system (the high-level signals of the lines of the trunk facility) and the low-level binary signal of the sense and control data TDM network 407.

Each MFSD interface circuit 3200A is an interface circuit to a service circuit. The circuit 3200A is itself universal in that it operates with either a toll multifrequency (TMF) detector or a dial tone multifrequency (DTMF) detector 3230 which, in response to tone signal inputs, provide as sense signals the digital outputs for two-out-of-six and two-out-of-seven, respectively, tone signal detections. The incoming multifrequency tones are switched through the TSI network 403 to MFSD interface circuit 3200A where they appear as analog tones. One detector 3230 is connected to each circuit 3200A. The TMF and DTMF tones present at the input to a detector enable the corresponding decoded digital outputs (sense signals) to be active. The MFSD interface circuit 3200A interfaces the digital outputs of the tone detector with the sense and control data DTM network 407.

Each toll multifrequency sender 3250 is a service circuit which gates tone pulses to the PCM CODEC circuitry for transfer through the TSI network 403 to a toll MF port. Binary control signals from the sense and control data TDM network 407 select two tones out of six coming from a tone plant interface 3270 and gate these two tones through a summing network to the PCM CODEC/filter circuit 3500-3. The tones originate in a precise tone generator 25000 (FIG. 1AB) and flow through a tone buffer 25100 (FIG. 1AB) to the tone plant interfaces 3270.

E. The Pulse Code Modulation Coding and Decoding Filter Circuit Assemblies (PCM CODEC Filters)

A set of five PCM CODEC filter circuit assemblies 3500-0 to 3500-4 provide the analog-to-digital and digital-to-analog conversions between the line and trunk interface circuits and the service circuit interfaces on the one hand and the digital stream of signals employed in the transmission of data to and from the TSI matrix network 403. Voice band pass filtering is also performed upon the analog signals before they are coded into the digital stream, and filtering to remove high frequencies is performed upon the regenerated analog signals before they are conveyed to the port circuits.

Each of the circuit assemblies 3500-0 to 3500-4 is associated with the three adjoining pairs of port circuits, and as such performs the analog-to-digital coding and decoding operations for each of three successive pairs of ports. Thus, the circuit assembly 3500-0 that connects to port pairs 00 through 05 provides the coding and decoding operations for port pairs 00 and 01, 02 and 03, and 04 and 05, respectively. For the thirty port positions, the set of five circuit assemblies 3500-0 to 3500-4 provide fifteen digital signal streams flowing in the direction of network 403, each stream representing the status of a pair of adjacent ports. Conversely, the five circuit assemblies 3500-0 to 3500-4 operate upon fifteen digital streams received from the network 403 to generate thirty analog inputs to the thirty port circuits.

Turning now to the details of the conversion of the analog signals into a digital stream, each conversion involves sampling and quantizing an analog signal input by the conventional, successive-approximation mode. This conversion produces an 8 bit, serial, binary word that represents the value of a sample. The serial value words from each of the successive pairs of ports are formatted into a single output frame consisting of two serial PCM output bits in tandem. The sampling is done at the 8 KHz rate conventional for telephony pulse code modulation. Two sample words are provided within the 125 microsecond sample period. Accordingly, the data rate of the output is 128 KHz. (Since 16 bits must be transmitted in the 125 microsecond period).

The decoding operation for regenerating an analog signal from the digital stream is essentially the reverse of the coding operation.

F. Voice Data Multiplexer and Demultiplexer Circuit (16000)

A voice data multiplexer and demultiplexer circuit 16000 performs transformations between the voice data format at the digital side of the CODEC circuit assemblies 3500-0 to 3500-4 and the voice data format on the port group highway (PGH) frame. As previously described, the format in the CODEC frame consists of two successive 8-bit words representing the PCM words derived from a pair of ports in a 125 microsecond time frame. The PGH format consists of thirty-two 0.488 microsecond timeslots presented in a 15.62 microsecond time frame, with the voice data from the thirty ports assigned to the timeslots 00 through 29. As will be later discussed, timeslots 30 and 31 provide binary sense and control channels (see FIG. 3). The circuit 16000 thus provides the 16 to 1 concentration factor needed to yield the thiryt-two timeslots and the reformatting needed to cause the proper transformation between the formats of the two digital streams. Specific bits taken from the PCM words flowing from each of the ports 0 to 29 are carried in the timeslots 00-29 of the PGH frame. At this point, timeslots 30 and 31 exist just as if the virtual port positions 30 and 31 actually existed. The concentration ratio and the reformatting are performed by means of random access memory circuitry within the multiplexer and demultiplexer circuit 16000.

G. Sense and Control Data Multiplexer and Demultiplexer Circuit 18000

A sense and control data multiplexer and demultiplexer circuit 18000 provides the other portion of the MUX/DMUX operation by which the grouping of the individual port circuit signals to a port group highway is effected. The partial MUX/DMUX performed by circuit 18000 involves the mergence and the separation of the sense and control data into and from the digital voice data. The binary sense data is strobed from the thirty ports over the sense and control bus 402''' and is separated into two fast sense bits SF0 and SF1 for each port which are carried in timeslot 30 of the PGH frame and eight slow sense bits SS0–SS7 for each port which are carried in timeslot 31 of the PGH frame (see FIG. 3). Only two of the eight slow sense bits are conveyed during any given PGH frame, so four successive PGH frames are required to transmit eight slow sense bits from each port. Similarly, two fast control bits CF0 and CF1 (carried during timeslot 31) and eight slow control bits CS0–CS7 (carried during timeslot 30) for each port are converted into signals and are applied to the sense and control bus 402''' for conveyance back to the individual ports. The timeslots 30 and 31 and the sense and control bus are thus time shared by all the ports. The circuit 18000 generates the necessary port strobe signals that read the supervisory sense data from the individual port circuit and clock the supervisory control data back to the individual port circuit.

The port group highway for each port group unit 402 comprises the transmit port group highway 402-00' that carries voice and sense data (multiplexed into the PGH time frame) from the circuits 16000 and 18000 to the associated time slot interchange (TSI) circuit in TSI matrix network 403 (FIG. 1AB), and the receive port group highway 402-00'' that carries voice and control data (similarly multiplexed) in the reverse direction.

H. Port Group Common Utility Circuit 20000

The port group common utility circuit 20000 comprises a circuit assembly that provides the following functions common to each port group. It provides interconnections between the line interface circuits and the single and multifrequency ringing generator 21000 (FIG. 1A). It also provides the interconnections between line and trunk interface circuits and test access circuits (not shown). Also included is an arrangement of relays that can interconnect selectively one of several test access buses to the test access connections of the interface circuits. This relay arrangement also can connect a receiver off-hook (ROH) signal generator 21200 to the port circuits. The circuit 20000 also provides a data transfer path (including a receiver driver) for the multiplexed, serial voice and control data that flows in port group highway (PGH) format from the associated TSI circuit 24000 over the receiving port group highway 402-00'' to the sense and control data multiplexer and demultiplexer circuit 18000 and through that circuit to the voice data multiplexer and demultiplexer circuit 16000.

I. Ringing Generators, etc.

A small group of circuits is associated with each of the port group units 402 to provide high-level ringing signals and the like. These consist of a ringing generator 21000 (FIG. 1A), an interrupter-serializer 21100, and a receiver off-hook (ROH) signal generator 21200. These are connected to the port group unit 402 by the port group unit utility circuit 20000.

The conventional ringing generator 21000 provides the normal 4-frequency series of ringing signals.

The ringing interrupter and serializer 21100 provides interrupted ringing for single frequency called-party ringing, and it also provides interruption and time phasing for 4-frequency called-party ringing. The output for single-frequency ringing produces output cadences consisting of two 1.28-second periods of ringing alternating with two 1.79-second periods of silence in a 6.14-second cycle. The output for 4-frequency ringing produces four 4-frequency outputs having the same cadence but shifted in time phase with respect to each other. Each of these 4-frequency outputs comprises four 1.28-second periods of ringing of differing frequencies alternating with four 0.25-second periods of silence in a 6.14-second cycle. The interrupter is driven by an output of port event processor (PEP 406).

The receiver off-hook (ROH) tone generator 21200 produces a distinctive tone signal, designed to get the attention of a subscriber who has left a receiver off-hook.

J. The Time Slot Interchange (TSI) Matrix Network 403

1. The Structure and Operation of the Buffer 24002 and the Send Buffer Unit 24003

With reference to FIG. 1AB, the timeslot interchange (TSI) matrix network 403 is a TDM network which provides the switching of PCM voice or tone data between selected pairs of port equipment positions. It comprises eight TSI circuits 24000-0 . . . 24000-7. (Only three of these are shown in the 3-dimensional drawing of network 403 in FIG. 1AB).

Each TSI circuit 24000 receives serial bit streams flowing from each of eight port group units 402 via their respective transmit port group highways (PGHs) 402' and transmits a stream of bits back to the same eight port group units 402 via their respective receive PGHs 402''. Each PGH supplies 2,048,000 bits each second, so each PGH timeslot is 0.488 microseconds in duration. Each 32-bit PGH frame has a duration of 15.62 microseconds. The frame rate is 64,000 frames per second. Each port group unit 402 contains 30 ports. A TSI circuit can service 8 times 30, or 240 port equipment positions, and the eight TSI circuits comprising the network 403 can service 1,920 port equipment positions.

Each TSI circuit 24000 has a transmit cross-office highway (XOH) that is used to make a connection to any of the port equipment positions associated with any of the TSI circuits. The XOH has a serial TDM frame containing 128 timeslots with an 8.192 MHz bit rate so that each timeslot is 122 nanoseconds in duration. Each 128 bit frame has a duration of 15.62 microseconds. The frame rate is 64,000 frames per second.

The binary data streams from eight port group units 402 enter a single TSI circuit (e.g., the data streams of PGHs 402-00' . . . 402-07' enter TSI circuit 24000-0, the data streams of PGHs 402-08' . . . 402-15' enter TSI circuit 24000-1, etc.) Note that FIGS. 1AB and 1B show only the representative port group highway 402-00'. These eight data streams are received by a multiplexer and sense data/tone data exhange buffer 24002 and by a send buffer unit 24003 which are connected serially together. The multiplexer and exchange buffer 24002 and the buffer unit 24003 together operate to multiplex selected frames of the eight data streams onto a single line.

The call control processor (CCP) subsystem 408 determines what TSI circuit 24000 and what port equipment position of that TSI circuit is the calling terminus of a duplex connection through the matrix switch port and what TSI circuit 24000 and what port equipment position thereof is the calling terminus of the duplex connection. The subsystem 408 then assigns a timeslot on the cross-office highway (XOH) eminating from the TSI circuit 24000 of the calling terminus to establish a path to carry the voice data in each direction.

Within the TSI circuit 24000, the binary data that streams from the eight port group units first passes through the multiplexer and buffer 24002. The multiplexer and buffer 24002 strip out the sense binary data and substitute therfore PCM tone data as is described in Section 2. The data streams then enter the send buffer unit 24003. The data bits of the selected PGH frames are buffered until the correct timeslot occurs on the associated transmit cross-office highway (XOH). Stated another way, the send buffer unit 24003 stores the selected binary data bits during the interval of the time coversion between the PGH timeslots and the selected XOH timeslots.

The timeslot which is the one into which the stored binary data bits are gated is the timeslot which CCP subsystem 408 has set up to transmit the voice or tone data to the particular TSI circuit and port equipment position associated with the other terminus of the duplex path. The 15.62 microsecond frame interval of the eight PGHs taken together contain 8 times 32 or 256 bits. The same 15.62 microsecond frame interval of the XOH frame contains only 128 bits.

2. The Multiplexer and Buffer 24002 Strips Out Sense Data and Inserts PCM Tone Data The last two timeslot positions (i.e. #30 and #31) of the 32 timeslot frame of the stream of binary data entering a TSI circuit along a transmit port group highway 402' contain the sense data bits that flow within the sense and control data TDM network 407. The multiplexer and exchange buffer 24002 functions to remove the sense data from the timeslots #30 and #31 and to send the sense data in the form of a serial data stream along highway 4002 to the port data storage network 405 (FIG. 1A) where the sense data is stored in a port data store 3300 or 3300' and later examined by the port event processor 406 and/or the call control processor subsystem 408.

It will be remembered that eight PGHs enter each TSI circuit 24000, with each PGH presenting two binary bits of sense data in the timeslots #30 and #31 of each PGH frame. Thus, the eight PGHs simultaneously coming into the TSI circuit 24000-0 present 16 bits of sense data that are shifted out of the multiplexer and data exchange buffer 24002 to the port data storage network 405 during each PGH frame.

The multiplexer and exchange buffer 24002 also inserts pulse code modulated (PCM) tone signals into the otherwise vacant PGH timeslots #30 and #31 at its output side. Dial tones, busy tones, and ringback tones are thus broadcast as if they were system ports. The digital data representation of these individual tones are introduced into each TSI circuit 24000 by a tone buffer 25100 in a synchronously timed relation such that the timeslots #30 and #31 of certain port group highway frames effectively operate as if they came from external broadcast ports. The multiplexer and sense data and tone data exchange buffer 24002 provides the tone binary signals in its binary data output. Under control of the CCP subsystem 408, the send buffer unit 24003 time-buffers the tone data until a transmit XOH timeslot (selected by the CCP subsystem 408) comes along and permits the binary data tone signal to be sent or "broadcast" to any selected port equipment position. The PGH frame which contains the binary tone data signal functions as if it were an external port equipment position containing broadcast tone plant equipment.

3. The Network of Transmit Cross-Office Highways (XOH)

As previously stated, the binary data bits arrive at a TSI circuit 24000 in a port group highway timeslot reserved exclusively for a specific port, and they leave the TSI circuit 24000 in a transmit cross-office highway (XOH) timeslot that is selected by call control processor subsystem 408 for the desired port-to-port switching connection.

A transmit cross-office highway originates in each TSI circuit. Referring now to the three-dimensional block diagram of the TSI network 403 depicted in FIG. 1AB, the TSI circuit from which a transmit cross-office highway originates may be identified as the circuit 24000 in which an output from the send buffer units is connected to the cross-office highway. Thus, XOH-0 originates in the TSI circuit 24000-0; XOH-1 in the circuit 24001; and XOH-7 in the circuit 24000-7 (the intermediate XOHs and the intermediate TSI circuits are not shown in the three-dimensional block diagram, as is indicated by dashed lines).

The origin of the data stream on each cross-office highway is the send buffer unit 24003 of the associated TSI circuit 24000. Each of the eight cross-office highways XOH-0, XOH-1, . . . XOH-7 terminates at one of eight inputs into a XOH selector 24004 within each of the eight TSI circuits 24000. Thus, the data from a send buffer unit 24003 in each TSI circuit is distributed to all of the TSI circuits, including the TSI circuit from which the data originates.

In summary, each TSI circuit has a send buffer unit 24003 that can transmit within each of 128 timeslot frames to any of the TSI circuits, including itself. Each cross-office highway XOH has 128 timeslots that may be used for data sending. Any one of the free timeslots may be used to transmit data to any of the other seven TSI circuits 24000 via a connection to those other circuits, or to any of its own ports via an internal connection to its own XOH selector 24004. The timeslots are used to establish a full duplex link through the TSI network 403. The output of a TSI circuit comprises binary bit signals in a cross highway time-frame containing 128 timeslots.

4. Space-Division Cross-Office Highway Selector 24004

The next operation is the switching of the cross-office highway timeslot which carries the binary data of the transmitting port equipment position into the cross-office highway selector 24004 of the TSI circuit 24000 having the port that is to receive the data. Again, this is done under control of the call control processor (CCP) subsystem 408, and more particularly by the CCP interfaces controller 54000. The cross-office highway selector 24004 comprises a multi-input, single-output, switch that selects one of the cross-office highways XOH-0, XOH-1, or XOH-7 during each cross-office highway timeslot. Accordingly, each TSI circuit 24000 may receive up to 128 inputs during the 128 XOH timeslots from any of the TSI circuits 24000.

As previously stated, the tone signals inserted by send buffer unit 24003 may be inserted into predetermined cross-office highway timeslots. The XOH selector 24004 of each TSI circuit can thus gate tones to a TSI circuit 24000 under control of the call control processor subsystem 408 whenever the transmission of tone signals to a selected receiving port equipment position is desired.

5. The Demultiplexer and Control Data Injection Buffer 24006 and the Receiver Buffer Unit 24005

The binary data signals that are passed by a cross-office highway selector 24004 of a TSI circuit 24000 enter a receive buffer unit 24005 where they are stored until the correct time arrives in the port group highway time frame for the signals to be passed through the demultiplexer and control data injection buffer 24006 into the correct outgoing timeslot in one of the receive port group highways 402" that extend from the TSI circuit. Then the data is sent to a selected port group unit 402 and to a pre-selected port.

Supervisory control data bits from the port data storage network 405 are periodically retrieved from the port data store 3300 or 3300' and are inserted into timeslots #30 and #31 of the port group highway serial data stream that flows back to each port group unit 402. This insertion is accomplished by the demultiplexer and conrol data injection buffer 24006.

6. Description of the Operation of the TSI Matrix Switch Network 403

The operation of TSI matrix switch network 403 is as follows: The eight port group highways 402' coming into a given TSI circuit 24000 carry serially multiplexed voice and sense data from up to 240 ports. The multiplexer and data exchange buffer 24002 and the send buffer unit 24003 function as a double time-division switch that selectively converts this data to a further multiplexed (sometimes called "super-multiplexed") form and assigns it to predetermined timeslots of the transmit cross-office highway (XOH) that originates from the TSI circuit 24000. The selection of the data and of the predetermined timeslots by which "cross-office" transmission is effected is controlled by CCP subsystem 408 by routing data stored within control and map random-access memories (RAMS) 24007. Within the TSI circuit 24000 for the port equipment position that is to receive the data, the cross-office highway selector 24004 functions as a space-division switch that gates the data in the predetermined timeslot presented by the selected cross-office highway into the receive buffer unit 24005. The XOH selector 24004 also operates under control of the CCP subsystem 408. The TSI circuit that receives the data may be the same as the TSI circuit from which the data originates. The receive buffer unit 24005 and the demultiplexer and injection buffer 24006 perform further space- and time-division routing of the data, also under control of CCP subsystem 408, and switch the data to the appropriate receive port group highway 402" and to the appropriate timeslot therein for the port equipment position that is to receive the data.

At the same time that the foregoing operations of switching voice data are taking place, the binary data corresponding to the sense data originating from all the ports is stripped off of the incoming PGH serial data streams by multiplexer and data exchange buffer 24002 and is routed to the port data storage network 405. In some instances, PCM tone data is introduced into the PGH timeslots vacated by the sense data. Within the demultiplexer and injection buffer 24005, binary control data from the port data storage network 405 is inserted into the serial data stream going back to the individual ports.

7. The Control and Map RAMs 24007

The control and map random-access memories (RAMs) 24007 provide memories for storing the calling equipment number, the cross-office highway (XOH) timeslot and the called equipment number for every path or connection that is set up through the TSI network 403. The RAMs 24007 also act as the real and reserve map-in memories of the actual and "reserved" paths through the TSI network 403. In the latter capacity, the RAMs 24007 serve as part of the memory for recording the state of each call. If this additional map-in-memory capacity did not exist, then the CCP subsystem 408 would require additional memory to record the actual and reserved paths through the TSI network 403. The CCP subsystem 408 has access to the map-in memories through the bus 54001 that connects the CCP interfaces controller 54000 and the RAMs 24007.

8. Functional Summary

It will be appreciated that the TSI matrix switch network 403 is a time-division multiplexed switch for establishing voice data paths between the various port equipment positions of system 400 via the transmit cross-office highways XOH of the various TSI circuits. The paths between the port equipment that are established by the network 403 are selected by CCP subsystem 408 acting through the controller 54000 and the control and map RAMS 24007. The TSI network 24000 also serves as a path over which binary sense data and binary control data can flow between the port group units 402 and the port data storage network 405.

9. The Signal Bit Flow Rate

It will be appreciated that overall, the switching of the serial data streams from one port equipment position to another is performed by the TSI matrix network 403 at the rate of 64 thousand bits each second for each port-to-port interconnection. The sense and control data multiplexer and demultiplexer 18000 operates with a 16 to 1 concentration ratio upon the 128 thousand bits per second that flow over each of the three signal paths emerging from each CODEC 3500-0 to 3500-4, providing a binary data stream to the transmit port group highway that contains about two million data bits each second. The multiplexer and data exchange buffer 24002 and the buffer unit 24003 concentrate this further into an 8 million data bit per second stream that is applied to each cross office highway. This stream is subsequently expanded by the receive buffer unit 24005 and demultiplexer and injection buffer 24006 back into a 2 million bit per second data stream applied to each receive port group highway which is subsequently expanded into a 128 thousand bit per second rate applied to each input of each CODEC 3500-0 to 3500-4.

K. The Tone Plant

A group of circuits are associated with the input port positions and the TSI matrix switch network 403 to introduce low-level tone signals. This group consists of a precise tone generator 25000, a toll multifrequency (MF) generator 25070 (optional) and a tone buffer circuit 25100. The precise tone generator 25000 and the toll MF generator 25070 are an operatively associated pair in which the tone signals are generated digitally. The precise tone generator 25000 produces the following precise tone frequencies: 1004 Hz, 620 Hz, 480 Hz, 400 Hz and 350 Hz. These are used for dial tone, low tone, busy tone, and ringback tone. In addition, the generator 25000 produces the following non-precise tones which are forwarded to the TMF generator 25070: 11.2 KHz, 230.4 KHz, 281.6 KHz, 332.8 KHz, 435.2 KHz, and 1.024 MHz.

The TMF generator 25070 provides six frequencies for use in multifrequency pulsing: 700 Hz, 900 Hz, 1100 Hz, 1300 Hz, 1500 Hz, and 1700 Hz. They are generated in pulse-rate-modulated, square-wave form for subsequent conversion into a sign-wave form within the toll MF sender circuits 3250.

Tone buffer 25100 is a formatting and distributing circuit for precise tones and for toll multifrequency tones. The broadcast tones are inserted directly into the TSI network 403 and are distributed by a technique already described that negates the need to use input ports for broadcast tones.

L. The Port Data Storage Network 405

The primary function of the port data storage network 405 is to provide an individual data memory field for each port. These data fields are one of two paths of communication between the port event processor 406 and the call control subsystem processor 408. They also constitute a buffer store between the port event processor 406 and the sense and control data TDM network 407, which in turn is the communication path for supervisory data between the port event processors 406 and the port circuits. Thus, the port data storage network is an essential link in the communication between the processors and the port circuits.

The circuits within the network 405 include the demultiplexers, filters, and multiplexers 3200 and 3200' which comprise demultiplexers and filters for the incoming sense data and multiplexers for the outgoing control data. The elements 3200 may be accessed directly by either the port event processor 406 or by the call control processor subsystem 408. The network 405 also includes a pair of port data stores 3300 and 3300', one for each of two port control processors 3400 and 3400' within the port event processor 406. Stores 3300 and 3300' also may be accessed directly by the call control processor subsystem 408. The port data stores 3300 and 3300' contain a record of the past and present status of each port and also serve as a repository for temporary values relating to the operation of the port control processors 3400 and 3400' within the port event processor 406. Sequential monitoring of each port by the processors 3400 and 3400' is achieved by gating the data for each port out of the port data store 3300 or 3300' and out of the demultiplexer, filter, and multiplexer 3200 and 3200' and into the central registers of the appropriate port control processor 3400 or 3400' in rapid sequence. Each processor 3400 or 3400' is thereby able to monitor up to 1,024 ports once every 32 milliseconds, devoting approximately 32 microseconds of processing time to each individual port—sufficient time to execute over 100 microinstructions, if necessary. In the preferred embodiment, each processor monitors 960 ports. The two processors 3400 and 3400' thus monitor all of the system ports, devoting up to 32 microseconds of real-time processing to each port every 32 milliseconds.

Figure 2:
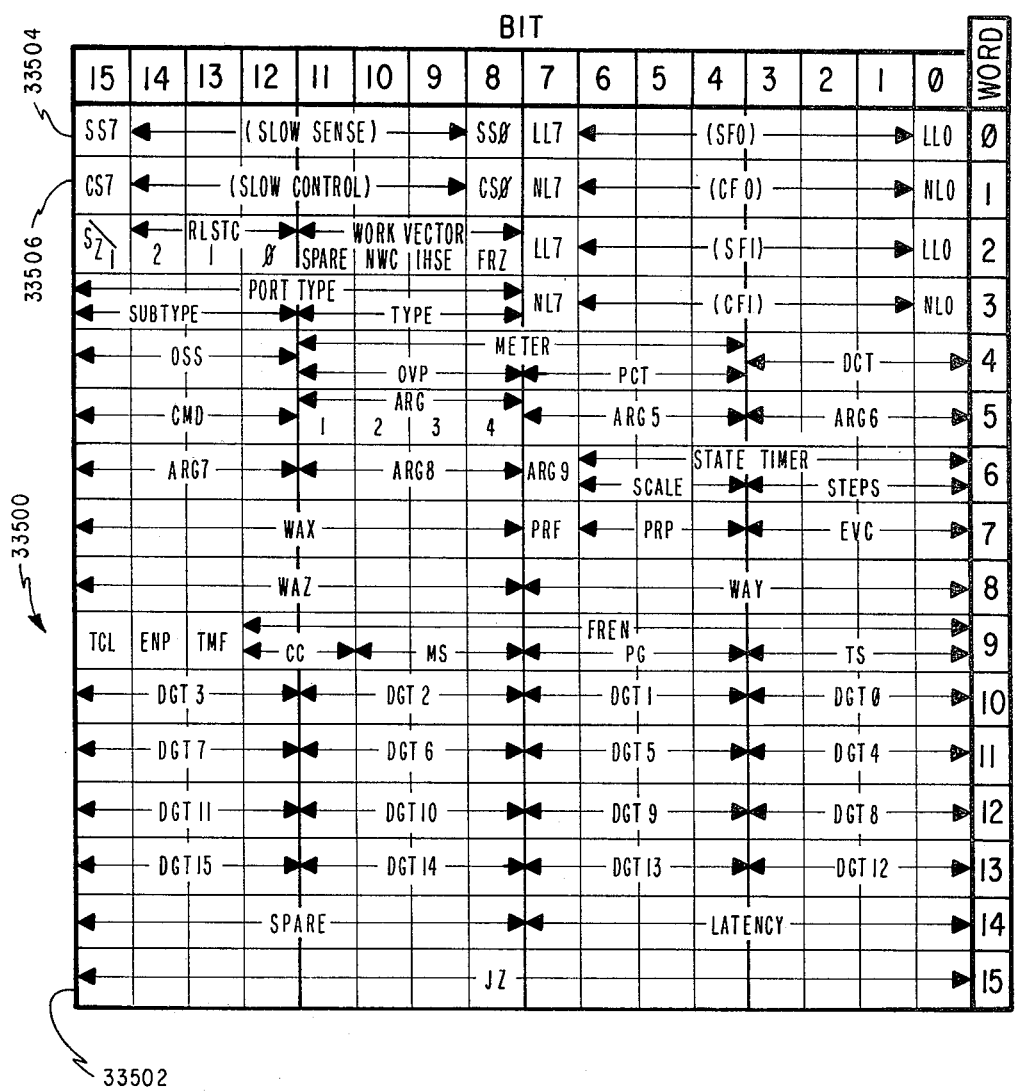
FIG. 2 is a layout representing the format of a 16-word port data memory field that is associated with each port equipment position of the system of FIG. 1A in one implementation of the preferred embodiment of the invention.

When the registers within one of the port control processors 3400 or 3400' are exchanged, as they are once every 32 microseconds, the new register data comes partly from the port data store 3300 or 3300', where temporary values are stored along with data defining the past status of the port, and partly from the demultiplexers, filters, and multiplexers 3200 or 3200', where a record is maintained of the current status of sense signals coming from the port. All of this information is presented to the port control processor 3400 or 3400' as a single block of port data having a format that, for example, might be organized as is shown in FIG. 2 as port data field format 33500, although many other arrangements are possible. As this data is transferred into the port control processor registers, a similar block of data for some other port is transferred back to the port data store 3300 or 3300', with the control data flowing directly to the multiplexer within one of the demultiplexers, filters, and multiplexers 3200 or 3200' for transmission back to the port in due course.

The sense data flowing from the demultiplexer, filter, and multiplexer 3200 or 3200' reflects the state of the port sense signals during the immediately-preceding four milliseconds, in accordance with the sampling rate of the port data storage network 405. No record of the past status of the sense signals is maintained except within the port data store 3300. But as to one sense signal that may fluctuate rapidly and that must be closely monitored, the digital filtering circuitry (FIG. 16) within the element 3200 or 3200' captures one sample every millisecond and filters these samples digitally down to eight filtered samples each 32 milliseconds. Accordingly, each sample of this signal represents the average state of the corresponding sense data bit averaged over four milliseconds. Excellent filtering and noise immunity is thus achieved, and the port control processors are able to follow accurately the fluctuations of this signal even if it fluctuates rapidly.

M. The Port Event Processor 406

The port event processor (PEP) 406 comprises a pair of port control processors 3400 and 3400' that share a common instruction store 3500. The processors 3400 and 3400' access the common instruction store 3500 in alternation so that one is processing an instruction while the other is accessing an instruction. The port control processors 3400 and 3400' scan the port circuits for status changes. More particularly, the port control processors 3400 and 3400' scan the indicators of port supervisory conditions and/or other indicators of the detection of port conditions by executing programs contained within the instruction store 3500 specified by the call control processor (CCP) subsystem 408. The program address of the program to be executed is recorded, for example, in a program address subfield 33502 (FIG. 2) of the port data field. Based upon the port sense data which is the subject of interrogation, the port control processors 3400 and 3400' may generate changes in the outgoing supervisory or other control signals at the port interface or service circuit and/or communicate with the call control processor subsystem 408, via the port event store 400, which functions as a FIFO shift register for messages.

Communication between the port event processor 406 and the call control processor subsystem 408 can also be accomplished by a command which the call control processor subsystem 408 sends via the interfaces controller 54000 and the tri-state bus 3700 to the port event processor 406 via the data field 33500, and this command defines the sequence of logical operations that are performed by the port event processor 406 to provide impulse analysis or other processing for the detection of specific port conditions. For example, the call control processor subsystem 408 might place in the program-address location 33502 the address of a particular program within the instruction store 3500. Such command can preset the processing that is to be performed upon the detection of a specific port event. The normal processing which a port control processor performs upon the detection of a port condition that is anticipated by such a command includes communicating a coded response (i.e., an event code) representing the port condition to the CCP subsystem 408 via the port event store 4000. The subsystem 408 in response thereto may establish a data path through the network 403 and generate the next command for the port control processor. Several such stimulus and response type cycles take place during the progression of a typical call.

Each of the processors 3400 is a customized, microinstruction-controlled processor constructed from "bit-slice" logic assemblies of the type used in constructing microcomputers. But the instruction store 3500, which corresponds roughly to a microprocessor instruction store, is larger than such a store and contains entire program sequences for servicing the individual ports. The port status data that is gated into the central registers of the port control processor 3400 and that reflects the state of the port as well as the current state of the port's sense signals actually specifies the address of the microinstruction sequence within the instruction store 3500 that is to service the immediate needs of the port. Accordingly, a change in the port sense signals or an alteration in the port status data (performed by the call control processor subsystem) can automatically cause an appropriate microprogram within the instruction store 3500 to be executed the next time the port data is serviced without the need for interrupts.

Among other programs stored within the instruction store 3500 there may be the following: Programs to provide impulse analysis to detect such supervisory events as seizure and release, wink or hookflash, stop dial, and delay dial; programs to generate outgoing supervisory signals such as wink, hookflash, wink off and delay dial; programs to apply ringing signals to the lines and to sense the occurrence of a ring trip; a program to send dialing digits to the port equipment interface circuit for outpulsing in dial-pulse or multifrequency tone-pulse form; and programs to receive and rack the digits introduced at a port-equipment interface circuit. These are illustrative of the many possible types of port control processor programs that may be provided. The increased flexibility of having programmable port control processors may make it possible to shift some functions traditionally carried out by the call control processor into the port control processors subsystem in addition to those just enumerated.

N. The Sense and Control Data TDM Network 407

The sense and control data TDM network 407 includes: (i) the sense and control portions of the interface and service and circuits 2000, 2000', 3000, 3200, and 3250 which form input and output connections to the sense and control bus 402'''; (ii) the sense and control data multiplexer and demultiplexer 18000 and the common utility circuit 20000 which convey sense and control signals between the bus 402''' and the port group highways 402-00' and 402-00''; (iii) the buffers 24002 and 24006 which transfer sense and control data bits between the port group highways and the signal lines 4002 and 4004; (iv) the demultiplexers, filters, and multiplexers 3200 and 3200', which transfer the sense and control signals between the signal lines 4002 and 4004 and the port data stores 3300 and 3300'; and (v) the port data stores 3300 and 3300'.

The function of the network 407 is to provide paths for the communication of binary data between the port event processor 406 and the interface and service circuits in the port equipment positions. Control data from the processor 406 is transferred over the buses 3600 and 3600', through the multiplexers 3200 and 3200', and onward to an equipment interface circuit or service circuit over the path just outlined above. This same control data is also transferred into word 1 and into bits 0-7 of word 3 (FIG. 2) within that section of the port data store 3300 or 3300' for the port to which the control data corresponds. Sense data from the interface circuits or service circuits, which represents the status of relay contracts or of electronic latches therein, is transferred over the reverse path to the processor 406 and is also recorded in word 0 and bits 0-7 of word 2 in the port data field 33500 (FIG. 2) within that section of the port data store (3300 or 3300') corresponding to the port where the sensed data originates. Ten different binary sense signals from each interface circuit or service circuit may be sampled each 32 milliseconds, and at least one is sampled at an effective four-millisecond rate, as has been explained. Eight data bits representing the state of this "fast bit" sense signal every four milliseconds over the past 32 milliseconds are stored in bit positions 0-7 of word 0 in the port data field 33500 (FIG. 2). Similarly, ten different control functions may be sent back to each port position during each 32 millisecond period.

The network 407 provides the information channels in each direction between the interface and service circuits and the port event processor 406. It does this in a way which utilizes the port group highways that couple the port group units 402 to the TSI matrix network 403. Briefly, the port group highways 402' and 402'' have a frame which multiplexes the PCM voice data for 30 ports using 30 timeslots of a 32-timeslot frame. The circuitry for formatting the port group highway frame reserves two timeslots in addition to those needed for the 30 ports for the transmission of sense and control data. The two timeslots in each port group highway frame is time divided over a period of 4 milliseconds to provide fast channels (with a strobe or sampling rate of 1 millisecond), and slow channels (with a strobe or sampling rate of 4 milliseconds), and these correspond to the fast and slow sense and control signals respectively described above. In the preferred embodiment, only one of two possible fast sense bit channels is presently fully operational, since no "fast-bit" filter (see FIG. 16) is presently installed for a second sense channel. (A second filter identical to that shown in FIG. 16 could easily be added if it were necessary to provide two "fast-bit" channels).

O. The Call Control Processor (CCP) Subsystem 408

1. The Major Components of the CCP Subsystem 408

The CCP subsystem 408, which is a microprocessor-based, stored program system, comprises a processor unit 50000A, the processor bus BCCP, a call control interface controller circuit 54000, and a memory 56000 for holding a call control stored program 56002. All communications between the CCP subsystem 408 and either the port data store 3300, the port event store 4000, and TSI matrix switch network 403 must go through controller 54000.

2. The Data Stored In Other-Than-Conventional Memory

While the memory 56000 contains the processing logic and some of the data base for the processing performed by the subsystem 408, it does not contain an internal map-in-memory of the TSI matrix paths, nor a data base storing specific call state information such as on-and-off hook status, dial-tone requests, ring-line requests, etc. Instead, the TSI matrix network 403 is itself used as the recording media for TSI paths, and the port data field 33500 (FIG. 2) for each port contains the specific call state data. This externally stored information contained in the network 403 and in the port data store 3300 or 3300' is stored in random access memories (RAMs) which are addressable using the normal memory access instructions applied to the tri-state bus via the controller 54000. Stated another way, the controller 54000 manipulates the binary information content of the network 403 and the port data stores 3300 and 3300' to give the processor 50000 a access to this external information.

3. Overview of the Call Control Stored Program 56002

Call control stored program 56002 is the primary instrumentality for controlling the advancement of a call through its various stages, and for controlling port event processor 406. By controlling the port event processor 406 program 56002 controls the logical sequence by which the port event processor 406 processes sense data from the ports and the logical sequence by which the port event processor 406 controls the supervisory signal output and other functions of the port interface circuits and service circuits. Further, by controlling the port event processor 406, it controls the logical sequence by which an event code (representing occurrence of a port condition) is generated and communicated to CCP subsystem 408.

Exemplary of the stages through which a call is advanced are the following stages associated with a simple line-to-line (local) call through switching system 400.

a. Idle-to-dial tone (origination)
  b. Dial tone-to-first pulse
  c. First digit trasnslation (digit analysis)
  d. Third digit translation
  e. Final translation
  f. Answer
  g. Disconnect The mode of processor interaction by which CCP subsystem 408 controls the port event processor 406 has been previously described; namely, CCP subsystem 408 places commands into subfields of the port storage area 33500, including the program address location 33502.

4. The Stored Program 56002 and the "State Transitions"

Program 56002 advances a call through its stages by "state transition" modes. The logic of program 56002 is organized to have up to 256 fundamental states, which generally correspond to the logical sequence needed for specific call stages. Call state transition is the process of making a transition from the present state of a call to the next state, based upon interaction with the port event processor 406.

In the course of performing state transitions, program 56002 performs the following common control functions normally found in an office swithing system:

a. Translator functions, including: class of service checks and associated restrictions and routings; identification number translations; code translations; and route translations.
  b. Switching matrix control functions including: recovery of linkage information of existing paths; path selection; path setup and disconnection (i.e., marking or unmarking of TSI matrix switch paths); reservation of path; and busy checks.
  c. Control of ringback tones.

Finally, stored program 56002 also functions to record the fact of itself being in a new state by entering this information into the port data storage area (FIG. 2).

5. The Tiered Structure of Stored Program 56002

Functionally, CCP stored program 56000 may be regarded as having 4 tiers.

Executive Tier 56004. An executive tier 56004 has the primary function of scanning information communicated to CCP subsystem 408 to detect ports which require processing. Based upon information recorded in the port data field 33500 (FIG. 2) for the port, including the call state and information received from the port event store 4000 in FIFO order, a module in executive tier 56004 vectors the logic to perform a particular state transition. The call state transition is performed by a call state transition routine which takes system 400 from its existing call state to the next.

State Transition Tier 56006. A state transition tier 56006 contains stored program modules which provide the logic to formulate such a transition routine. The logic within tier 56006 cannot perform a complete call state transition. Logic in the tiers to be next described are necessary to constitute a complete transition routine.

Shared Subroutine Tier 56008. A shared subroutine tier 56008 contains modules of common shared subroutines such as equipment connection subroutines, equipment release subroutines and translation subroutines. These again require the services of the next lower level tier to be described next.

Shared Input and Output Utilities Tier 56010. A shared input and output utilities tier 56010 contains the stored program logic for accessing port data stores 3300 and 3300', accessing TSI matrix switch network 403, and accessing certain stored program system data bases.

6. The Access Cycle to the Port Data Stores 3300 and 3300'

Although for purposes of internal operation, CCP subsystem 408 is a synchronous computer, it operates asynchronously in obtaining access to specific port data fields 33500 of the port data stores 3300 and 3300'. The control circuitry of stores 3300 and 3300' operating in conjunction with the port control processors 3400 and 3400', make it possible for processors 3400 and 3400' to operate on data from a different port every 32 milliseconds. Data from the slower speed stores 3300 and 3300' is transferred to and from the fast memories of processor 3400 and 3400' during a sequence of steps within every 32 microsecond interval. The CCP subsystem 408 obtains access to the data in store 3300 and 3300' in a cycle stealing fashion by delaying the state sequence of the above transfer process. It will be appreciated that this ability to cycle steal by the subsystem 408, together with the asynchronous access mode of subfield 408, virtually eliminates the "idle time" of waiting for a scanning interval (such as would exist with a synchronous form of access).

P. A Brief Description of the Overall Operation of the System 400

The following is a brief description of the operation of the system 400 which illustrates the nature of the interaction of the port event processor 406 and CCP subsystem 408. The status of various functions of port interface and service circuits (e.g., status of incoming supervision of lines and trunks) are processed by the port event processor 406 for the particular port equipment positions involved. The processing of this by the port event processor 406 is performed in accordance with a data program called up by the data recorded in the port data field 33500. When such a program detects a condition to which it is to respond at the port, it may generate binary output control signals to control various binary control functions associated with the interface circuit in the port equipment position (e.g., the outgoing supervisory control signal for a trunk). It may communicate (via the port event store 4000 and the port data field 33500) with CCP subsystem 408 an indicia that a port event has occurred. The control function for the line circuit, trunk circuit, or other interface or service circuit is communicated over the binary control channels (word 1, and bits 0-7 of word 3, of the port data field 33500). The transmission of an indicia of the occurrence of an event to the CCP subsystem 408 is accomplished by having the port event processor, which does not know what set of port data it is processing, command the port event store 4000 to place the number of the port equipment position being processed into the port event store 4000 queue. (The port event store 4000 can obtain the number of the port being processed from, for example, the port counter 3390A in FIG. 14.) This FIFO queue can then be accessed by CCP subsystem 408 over the tri-state bus. CCP subsystem 408 checks this queue and is responsive to the indicated event to effect a transition to a different call state by invoking a particular state transition routine. Once the transition routine has completed the transition, CCP subsystem 408 changes the coded command in the port data field 33500 and thereby defines the new logical sequence with which the port event processor 406 will interrogate the status of the port circuit until commanded to do otherwise.

II-DETAILED DESCRIPTION OF THE PORT DATA STORAGE NETWORK AND PORT EVENT PROCESSOR

The preceeding paragraphs have presented an overview description of a community office switching system designed in accordance with the present invention. The paragraphs that follow present a detailed description of the port event processor 406 and the port data storage network 405. The elements 405 and 406 are first described in overview, with the discussion focusing upon their interactions with the remainder of the switching system 400. Next, the components of the elements 405 and 406 are described.

A. Overview Description

Figure 4:
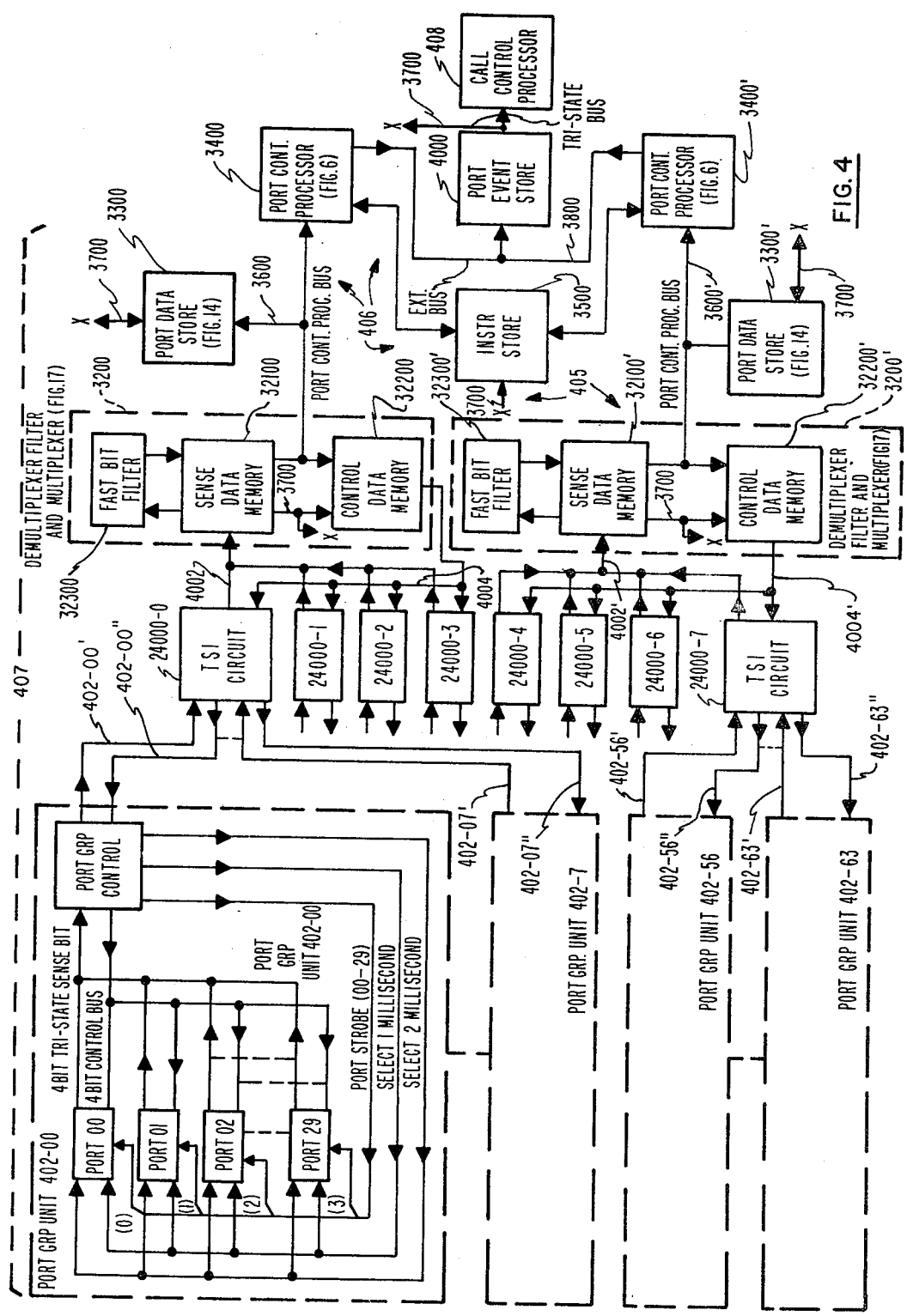
FIG. 4 is block diagram of the TDM sense and control data network 407 and the port control processor 406.

Referring now to FIG. 4, therein is disclosed an overview block diagram of the switching system 400 components that participate in sensing port events, transmitting a record of such events to the call control processor subsystem 408, and transmitting control signals back to the individual ports. Virtually every element shown in FIG. 1 is also shown in FIG. 4, but whereas FIG. 1 is organized to depict in a simple manner the flow of voice signals from port to port through the TSI matrix network 403, FIG. 4 is organized to depict the flow of sense and control signals between the ports and the call control processor subsystem 408, passing through the demultiplexer, filter, and multiplexer 3200, the port data store 3300, and the port control processor 3400 on the way.

At the outset, it is to be noted that there are two demultiplexers, filters, and multiplexers 3200 and 3200' and two port data stores 3300 and 3300'. There are also two port control processors 3400 and 3400' both of which share a common instruction store 3500 that the two processors access on alternate clock cycles in such a manner that neither port control processor is ever delayed and a separate instruction store for each individual port control processor is not required. Both of the processors may output data to an external bus 3800 that, among other things, can feed data into a first-in, first-out port event store 4000 the output of which feeds into the call control processor subsystem 408. Each of the processors 3400 and 3400' is arranged to service 960 ports, and the two processors together service 1920 ports. Additional ports would be serviced by additional pairs of processors arranged as shown in FIG. 4. Since the upper and lower halves of FIG. 4 are technically identical, the discussion that follows is limited to the upper-half elements.

In the discussion that follows, we shall briefly trace the flow of "sense" bits from an individual port 402-00 to the call control processor subsystem 408 and the flow of "control" bits from the call control processor subsystem 408 back to the port 402-00.

Each port may generate up to ten binary "sense" signals indicating the "status" of the port—such things as whether any current is flowing over the port conductors, for example. The precise meaning of each of the ten parameters is not important to the present discussion. The ten binary signals represent the status of ten parameters of the corresponding port—parameters that must be conveyed to the port- or call control processor. Eight of these signals are assumed to fluctuate slowly, and these are called the "slow-bit" signals. One or possibly two are assumed to fluctuate rapidly, and these are called the "fast-bit" signals. It is assumed that the fluctuations of the "fast-bit" signals must be followed by the port control processor with a resolution of four milliseconds, and that a one-millisecond sampling rate plus digital filtering is required to resolve the sequencing of the fast-bit signals properly (note that only one fast-bit signal is actually processed in the disclosed embodiment, and an additional fast bit filter 32300 would be required to process a second such fast-bit signal).

Figure 3:
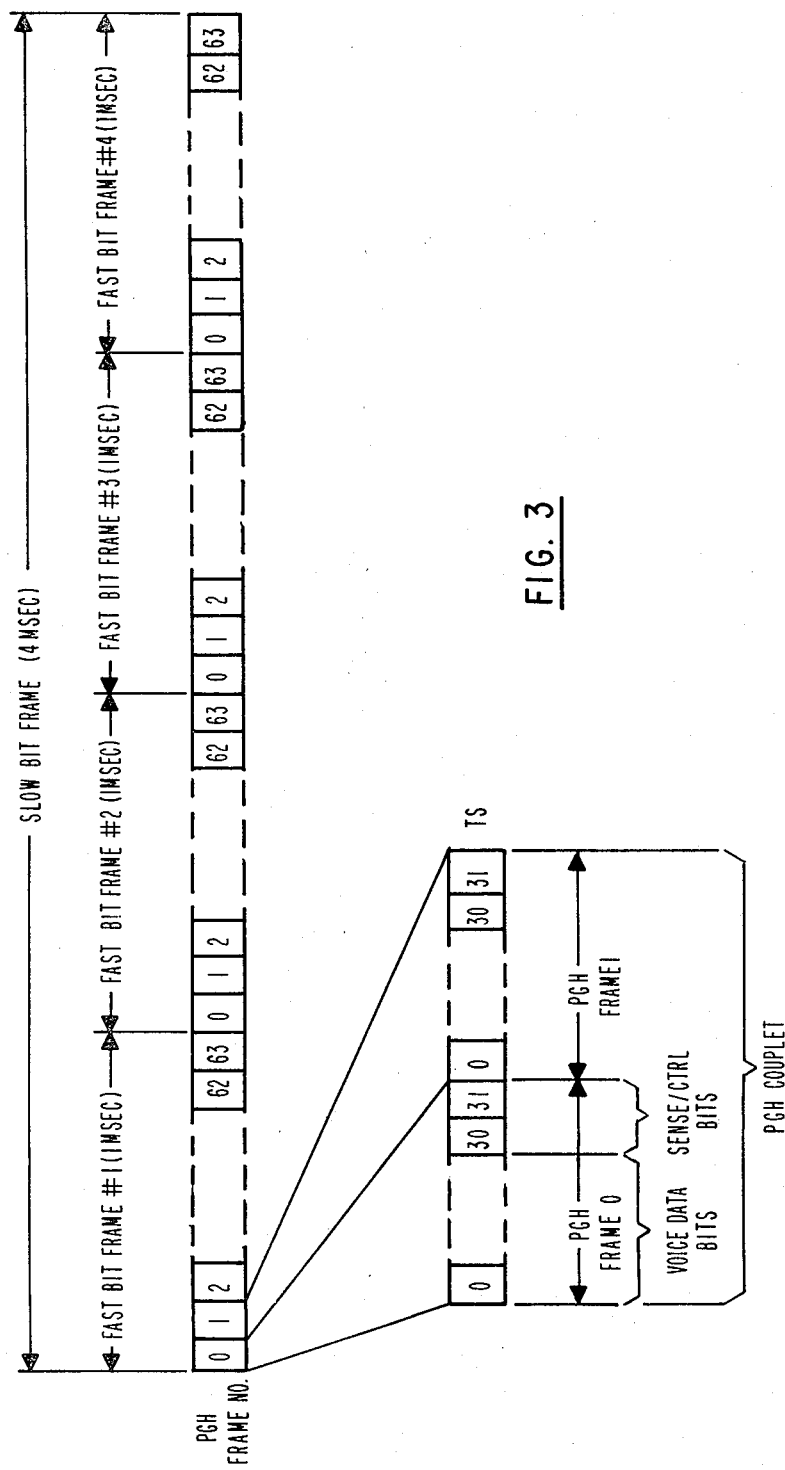
FIG. 3 depicts the timeslot formats of the slow bit frame of the sense and control data time-division multiplexer (TDM) network 407 in the system of FIG. 1A.

With reference to FIG. 3, and as has already been explained, each port group highway receives a single voice data bit from each of 30 ports during each port group highway frame. Since each such frame contains 32 bits (numbered "0" to "31" in FIG. 3), two extra bits (numbered "30" and "31" in FIG. 3) are available, and these are used to convey the sense bits. Bit "30" is used to convey a "fast-bit" signal, and Bit "31" is used to convey a "slow-bit" signal. During two successive port-group highway frames (called a "PGH couplet" in FIG. 3) two "fast-bit" signals for a single port may be sampled and conveyed during the two time slots "30", and two "slow-bit" signals for that same port may also be sampled and conveyed during the two time slots "31". Accordingly, four sense signals (two "slow" and two "fast") may be sampled and conveyed from each of thirty ports during the time interval represented by 60 of the port group highway frames comprising "fast-bit frame #1" in FIG. 3.

FIG. 3 indicates that four successive fast-bit frames comprise a four-millisecond "slow-bit frame." During each fast-bit frame, the two fast-bit signals from each of the thirty ports and two of the eight slow-bit signals from each port are conveyed. The fast-bit signals are conveyed during each of the four fast-bit frames. Different slow-bit signals from each port are conveyed during the four successive fast-bit frames that constitute a slow-bit frame. In this manner, the two fast-bit signals from each port are sampled and conveyed once each millisecond, while the eight slow-bit signals are sampled and conveyed only once every four milliseconds.

FIG. 3 depicts the bit stream that is applied to the port group highway for each group of 30 ports. As has been explained and with reference to FIGS. 1A and 4, groups of eight port group highways feed into each of the timeslot interchange matrix network 403 TSI circuits. Logic within the four circuits 24000-0 . . . 24000-3 routes all of the incoming sense bits to the sense data memory 32100 over a signal path 4002. Accordingly, time-division-multiplexed sense signal data intermittently flows over the signal paths 4002 and into the sense data memory 32100. The address signals generated by an address counter 32400 (not shown in FIG. 4—see FIG. 15) causes this sense signal data to be sorted out and stored within the sense data memory organized so that the sense data can be retrieved from the sense data memory 32100 in numeric order by port and applied to the port control processor bus 3600 for conveyance to the port control processor 3400 or to the tri-state bus 3700 (Labeled "x" in FIG. 4) for conveyance to the call control processor subsystem 408. In this manner, sense data is collected from each and every port and is stored within the sense data memory 32100 from which it may be accessed by the call and port control processors.

Control data generated by the call or port control processors follows esentially the reverse path back to the individual ports, as can be seen in FIGS. 1 and 4. Control data generated by the port control processor 3400 is supplied to the control data memory 32200 over the port control processor bus 3600, and control data generated by the call control processor subsystem 408 is supplied to the control data memory 32200 over the tri-state bus 3700. Address signals generated by an address counter 32400 (not shown in FIG. 4—see FIG. 15) then samples this memory data and thereby time multiplexes the control data for presentation to a signal line 4004 that feeds successive sets of four bits of control data to four TSI circuits 24000-0 . . . 24000-3 for application to the port group highway signal lines 402" conveying both the control information and also PCM voice information back to the groups of 30 ports where the voice and control information are demultiplexed and distributed to the individual ports. The process of distributing the control signals is thus the exact reverse of the process of gathering the sense signals.

Figure 5:
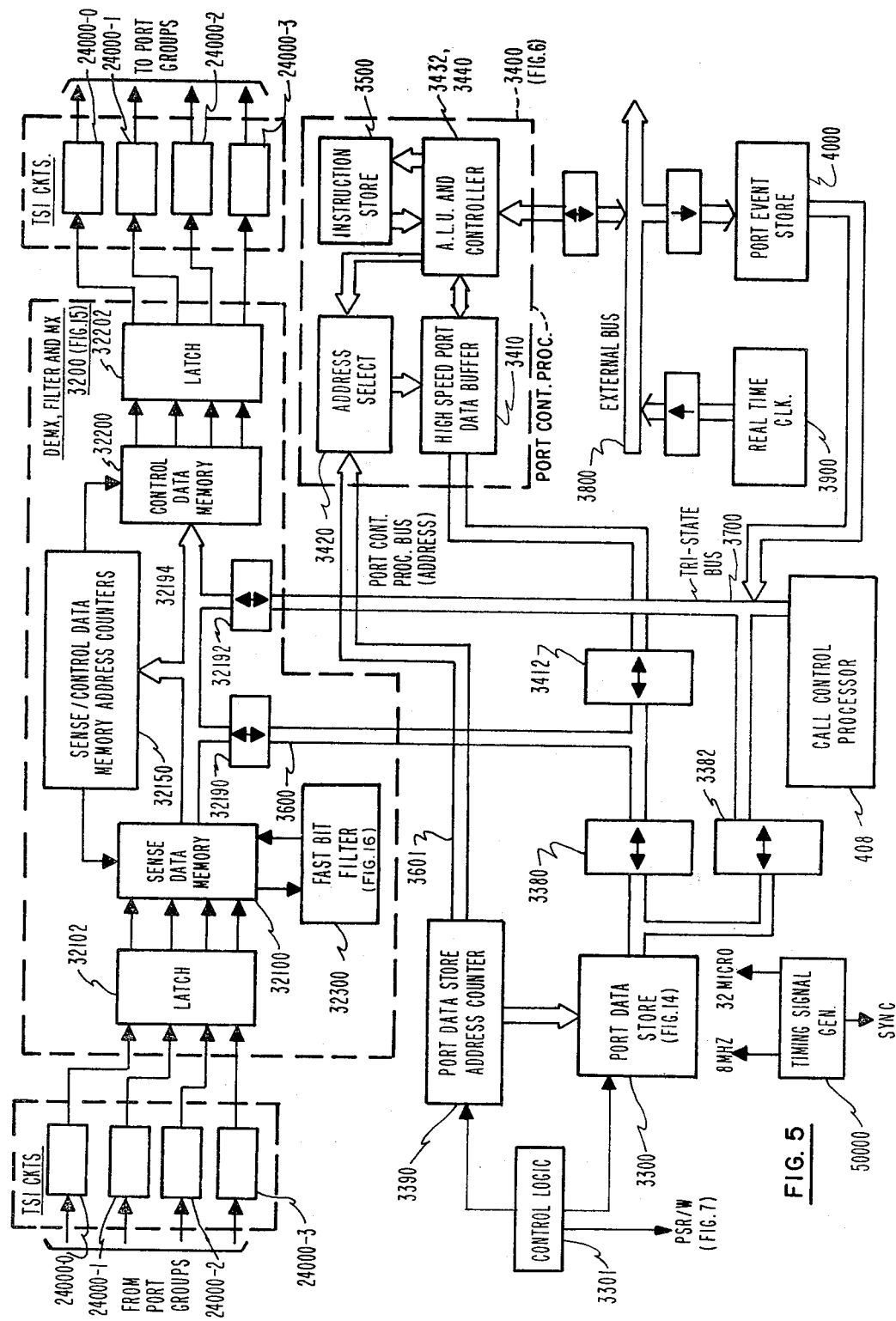
FIG. 5 is a block diagram of one-half of the port data storage network 405 and of the associated port control processor 3400.

FIG. 5 is a block diagram depicting all the elements shown in the upper half of FIG. 4 excepting the port groups. FIG. 5 thus depicts the call control processor subsystem 408, one of the two port control processors 3400, one-half of the eight TSI circuits 24000-0 . . . 24000-3, and all the logic that stores and conveys sense and control signals between these system elements. With the exception of the port groups, FIG. 5 thus depicts one-half of system 400 (FIGS 1A and 5). As with FIG. 4, FIG. 5 is laid out to illustrate the flow of sense and control signals. Sense signals enter from the TSI circuits at the far left and flow through a latch 32102 to the sense data memory 32100, as has been explained. Control data flows from the control data memory 32200 to the right through the latch 32202 and back to the TSI circuits 24000-0 . . . 24000-3 that appear to the far right in the drawing. Note that the same four TSI circuits 24000-0 . . . 24000-3 appear twice—to the far left and to the far right—in the drawings, since the sense signals flow in through these circuits from the left while the control signals flow out through these circuits to the right.

In FIG. 5, the port control processor 3400 is shown broken into three components: an arithmetic logic unit (A.L.U.) and controller 3432 and 3440; a microprogram instruction store 3500; a high-speed port data buffer 3410, which serves as a port data store area and as the working registers for the A.L.U. and controller; and an address select logic 3420 that allows the high-speed port data buffer 3410 to be addressed by both the A.L.U. and controller 3432, 3440 (as in a conventional microprocessor) and also by the port data store 3300 on alternate clock cycles, such that the port data store 3300 can access the buffer 3410 while the port control processor 3400 is accessing its instruction store 3500. In this manner, the port data store 3300 is given access to the buffer 3410 without slowing down the processor 3400 in any way, sharing the buffer 3410 in the same way that the processor 3400 shares the instruction store 3500 with the other processor 3400' (not shown in FIG. 5—see FIG. 4). The address select logic 3420 connects the address inputs to the buffer 3410 first to the A.L.U. and controller 3432, 3440 and then to the port data store address counter 3390 on alternate clock cycles. The high-speed port data buffer 3410 is also connected by a bi-directional latch 3412 to the data bus portion of the port control processor bus 3600. Accordingly, four data transfers into and out of the high-speed port data buffer 3410 are possible: transfers to and from the A.L.U. and controller 3432, 3440; transfers of port data to and from the port data store 3300; transfers of sense data from the sense data memory 32100 to the buffer 3410; and transfers of control data from the buffer 3410 back to the control data memory 32200. Sense data thus flows directly from the memory 32100 to the buffer 3410, and control data flows directly from the buffer 3410 to the memory 32200. The sense and control data memories 32100 and 32200 may thus be thought of as extensions of the port data store 3300 that are able to communicate with the individual ports.

If the port control processor 3400 were part of a conventional micro-processor, the high-speed port data store would simply be part of the "working" or high-speed registers of the microprocessor. A much larger "core" or "addressable" memory, containing program instructions and data, would be connected to the external bus 3800, and all data input and output devices would also be connected to the external bus 3800. Such a microprocessor would function by transferring into its A.L.U. and controller sequential numeric instructions retrieved from the external "core" or "addressable" memory over the external bus 3800. Each such instruction would cause the A.L.U. and controller to execute a corresponding sequence of "micro-instructions" retrieved sequentially from the microprogram instruction store 3500. These micro-instructions would cause data values to be retrieved from the high-speed port data store 3410 and/or from the "core" or "addressable" memory over the external bus 3800, would cause computations to be carried out upon these data values, and would cause the results of the computations to be returned to the "core" or "addressable" memory or to the high-speed port data buffer 3410. If such a conventional microprocessor were "time-shared" over several different jobs, typically the transfer of program control from job to job would be carried out by transferring the contents of the high-speed port data store 3410 for one job out of the processor 3400 and into the "core" or "addressable" memory over the external bus 3800 and by then transferring into the data store 3410 the corresponding high-speed register data values for some other job. Since the data values transferred out of and into the high speed port data store 3410 would include the address in the "core" or "addressable" memory of the next instruction to be executed, such a transfer effectively transfers the port control processor's attention from one job to the next. By having (for example) twenty sets of register data values corresponding to twenty jobs present within a "core" or "addressable" memory and by cyclically transferring these data values into the data buffer 3410, it is readily possible for such a hypothetical microprocessor to process twenty different jobs at once. (Note that the "core" or "addressable" memory referred to in the above discussion does not form a part of the port control processor 3400, for reasons that will soon be explained.)

Such a conventional microprocessor could probably monitor twenty to fifty separate ports. It could also monitor a much larger number of ports on an "interrupt" basis provided only twenty to fifty ports were active at one time. But if activity occurred simultaneously on 200 to 500 ports, such a conventional microprocessor would probably become overloaded and would have to delay responding to some of the port activity. Incoming dial pulses could be missed, and other undesirable results could occur. A specific goal of the present invention is the avoidance of all such delays, at least at the port supervisory level. Coventional microprocessors can give no guarantee that some port activity will not be missed unless enough microprocessors are provided so that each twenty to one-hundred ports have their own microprocessor.

Conventional "time-shared" processors also do not initiate the execution of programs at precisely predetermined moments in time. If a few, short programs need to be run, they are run in rapid succession; if many, long programs need to be run, each is run much less frequently in accordance with the determination of a "scheduler" program. But the precise time when a given program actually runs can only be determined by reference to an external clock. Accordingly, if individual "jobs" or programs are assigned to each port, those programs are rendered complicated by the need to reference some external time reference and to compensate in other ways for the uncertainty in when the programs actually run.

The present invention provides auxilliary hardware mechanisms for loading and unloading the high speed port data buffer 3410 directly from the port data store 3300 and the sense and control data memories 32100 and 32200. The port data buffer 3410 contains two sets of thirty-two 16-bit registers. During any given 32-microsecond interval, only one of the two 16-bit register sets may be accessed by the A.L.U. and controller 3432, 3440 and only the other of the two register sets may be accessed by the port data store 3300, the sense data memory 32100, and the control data memory 32200. During alternate 32-microsecond intervals, the accessibility of the two register sets is reversed. Accordingly, during any given 32-microsecond interval, the port control processor 3400 is processing the register data within a first half of the data buffer 3410 and corresponding to a first predetermined port of the system 400. The port control processor bus 3600 is simultaneously accessing the second half of the data buffer 3410, transferring its contents out to the port data store 3300 and to the control data memory 32200, thereby transferring out of the buffer 3410 data relating to a second predetermined port of the system 400 whose port data was just processed during the immediately preceding 32-microsecond interval. The bus 3600 is also transferring into the second half of the data buffer 3410 data taken from the port data store 3300 and the sense data memory 32100 relating to a third predetermined port of the system 400, whose data is to be processed next. After 32-microseconds, the port control processor A.L.U and controller are given access to the second half of the buffer 3410, the bus 3600 is given access to the first half of the buffer 3410, and the above operations are repeated. This time the data for the third predetermined system port is processed, the data for the second predetermined system port is transferred out of the first half of buffer 3410 and into the port data store 3300 and the control data memory 32200, and the data for a fourth system predetermined port is transferred out of the port data store 3300 and the sense data memory 32100 and into the first half of the buffer 3410. After another 32 microseconds, access to the buffer 3410 is again reversed, and this process continues until after 32 milliseconds the port control processor has spent slightly less than 32 microseconds processing the data for each of the 960 ports to which the processor is assigned. The configuration illustrated thus makes it possible for a single port control processor 3400 to devot almost 32 microseconds out of every 32 milliseconds to each of up to 1024 individual ports, with a dedicated time slot provided for each port, so that no port may ever be locked out, and so that the data for each port is processed at precisely-spaced 32 millisecond intervals.

The port data placed within the buffer 3410 automatically causes a sequence of micro-instructions within the instruction store 3500 to be executed. Again, a conventional microprocessor operates in a different manner. Such a processor retrieves an instruction from an external "core" or "addressable" memory over its external bus, and more particularly retrieves such an instruction from a memory location whose address is stored within one of the microprocessor's high-speed registers—usually a register called the "instruction counter." The retrieved instruction is then decoded (typically using a read-only memory) into an address within the instruction store 3500 of a microprogram sequence that is then executed. The "instruction counter" is then updated, and the next instruction is retrieved from the external "core" or "addressable" memory, and the above process is repeated. This conventional arrangement is flexible and is capable of executing highly complex algorithms, but much time is lost in retrieving instructions from the "core" or "addressable" memory over the external bus 3800. In 32 microseconds, such a conventional microprocessor could not perform all the tasks that must be performed to properly service the real-time needs of a port that is serviced only once every =milliseconds.

The present invention does not utilize a conventional "core" or "addressable" instruction memory. Instead, the contents of word 15 (33502 in FIG. 2) within the port data field of the high speed port data buffer 3410 are taken to be a single instruction defining what type of port service is required. These bits form the actual address of a micro-instruction sequence within the instruction store 3500 (FIG. 4) that is executed to service the port. Separate micro-instruction sequences are provided for each possible state of the port data. The processing is normally completed within 32 microseconds. But if the end of the 32 microsecond interval occurs before the complete set of micro-instructions is processed, then the address of the next micro-instruction to be executed is stored within location 15 (33502 in FIG. 2) within the buffer 3410 so that the next time the data for the same port is again processed (32 milliseconds later) the designated micro-instruction sequence is automatically reinitiated. Conventional computers do not normally interrupt micro-instruction sequences in midstream in this manner but only provide for interruptions between macro-instructions.

The external bus 3800 is thus not used to provide access to a "core" or "addressable" memory. It is used to provide a communication path between the port control processor (3400) and, for example, a real-time clock 3900, a supervisory memory 3950 (FIG. 1A), and a first-in, first-out port event store 4000 that feeds port event information to the call control processor subsystem 408. The external bus 3800 may also provide communication to other devices not shown in FIG. 5. The real-time clock, together with the precisely time-spaced initiation of the micro-instruction sequence for each port, together enable the port control processor to measure the duration of both very short and very long events such as "off-hook" and "on-hook" conditions, the frequency of ringing signals, their duration, and their spacing. They also enable the port control processor to generate control signals of precisely-timed durations for signaling and other purposes. The port event store 400 allows the port control processor to interrupt the call control processor subsystem to inform it of significant port events, such as "on-" or "off-" hook events or the completed reception of a dialed series of digits. The port event processor 406 makes it unnecessary for the call control processor subsystem 408 to scan the status of the individual ports continuously.

The above features in combination enable the port control processor 3400 to assign a fixed slice of time to each of 960 ports, executing over 100 microinstructions for each port at points in the time spaced precisely 32 milliseconds apart. But the port control processor cannot sample and filter the "fast-bit" port sense signals and still give adequate service to each of 1024 ports. Accordingly, the sampling and filtering of the "fast-bit" sense signals is carried out by an external, digital-filtering processor called a fast-bit filter 32300. The details of this fast-bit filter are disclosed in FIG. 16, and it is described at a later point in this specification.

B. The Port Control Processor

The above overview discussion has described the various major features of the present invention. The details of the preferred embodiment of the invention are described in the remaining FIGS. 6 through 17. With the exeption of FIG. 16 (the fast-bit signal filter 32300), these figures are relatively self-explanatory and need little explanation. Needless to say, many other possible arrangements of the circuit details could be provided that would reflect the spirit of the invention.

Figure 6:
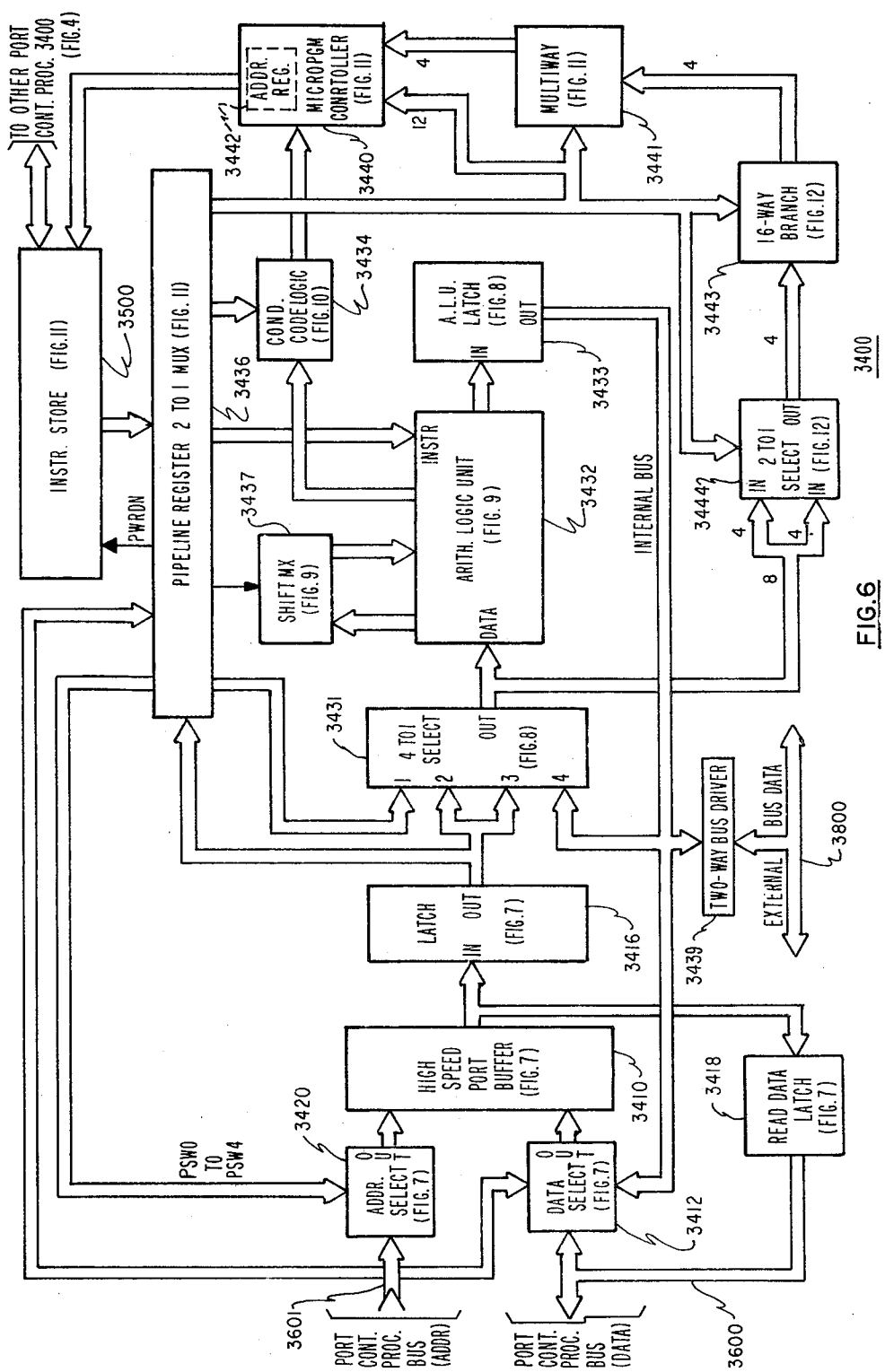
FIG. 6 is an overview block diagram of the port control processor 3400.

The details of the port control processor 3400 are set forth in overview in FIG. 6, and individual components of the processor are described in greater detail in FIGS. 7 through 13.

With reference to FIG. 6, the port control processor is constructed primarily from "bit-slice" microprocessor logic modules manufactured by Advanced MicroDevices, Incorporated. The microprogram controller 3440 is constructed from Am2911 modules. The arithmetic logic unit 3432 is constructed primarily from Am2901A modules. Each "bit-slice" module provides for processing four bits of data, and the "bit-slice" modules may be connected serially and used to process eight, twelve, sixteen (etc.) bits of data (see, for example, FIGS. 9 and 11). Hence, four microprogram sequence modules provide 16 bits of address output from the microprogram controller 3440 (see details in FIG. 11) and two arithmetic logic modules provide 8-bit processing within the arithmetic logic unit 3432 (see details in FIG. 9). All other components are constructed from off-the-shelf memories, latches, gates, and other standard digital logic components available from many different manufacturers. Transistor-transistor-logic with Schotky-barrier diodes are used generally to give acceptable high-speed switching performance. Memories used are of the static or dynamic random access type, with high-speed memories being used in those applications where high-speed access is essential, as within the port control processors. The high-speed port data buffer 3410, for example, is constructed from two Signetics 82S09 576-bit (64×9) bipolar random access memory modules or equivalent memory giving two register sets of thirty-two 18-bit words, (16 data bits, two parity error check bits). The port data memory (3362 in FIG. 14) is constructed from eighteen Intel 5116 P-4 logic modules, each a 16,384×1-bit random access memory, together giving 1,032 sets of sixteen 18-bit words (sixteen data bits, two parity error check bits). The sense and control data memories 32100 and 32200 are each constructed from four Intel 2147 4096×1 bit random access memories which can store sixteen sense or control data bits for each of up to 1,024 ports.

No point can be served by including in this specification a detailed explanation of how a microprocessor functions, since the literature is replete with such explanations, and explanations are also published by the manufacturers of the bit-slice microprocessor modules. Advance Micro Devices, Inc., the manufacturer of the modules that comprise the arithmetic logic unit 3432 and the microprogram controller 3440, has published detailed descriptions of how these and other modules obtainable from the same source may be interconnected to form a custom-designed microprocessor. FIGS. 6 through 13 disclose the details of the microprocessor configurations adopted for use as part of the present invention. Accordingly, the discussion that follows points out the ways in which the processor 3400 differs from a standard microprocessor.

With reference to FIG. 6, most microprocessors include a micro-instruction store 3500, a pipeline register 3436 into which microinstructions are gated, an arithmetic and logic unit (A.L.U.) 3432 for performing computations and for storing intermediate results, some form of condition code logic 3434 for testing the result of each computation, and a microprogram controller 3440 containing a program address register 3442 which register controls the selection of the next micro-instruction from the instruction store 3500. Most microprocessors typically include an external bus 3800 connecting to external devices (as well as to a "core" or "addressable" program- and data-storage memory; note that no such memory is required by the preferred embodiment of the present invention) and interfacing with the A.L.U. 3432 through a two-way bus driver 3439. The driver 3439 is connected to the A.L.U. 3432 by a 4-to-1 input selection logic 3431 that can also accept data from an A.L.U. latch 3433 that receives data from the A.L.U. 3432 output.

In a conventional microprocessor, an instruction sequence is initiated when an instruction is brought in from an external "core" or "addressable" memory over the external bus and is decoded, typically by a read-only memory, into a microprogram memory address that is fed into the microprogram controller 3442 to initiate a microprogram sequence. In the present invention, the internal registers of the A.L.U. 3432 are supplemented with the additional registers within the high speed port data buffer 3410 (one-half of which, it will be remembered, are accessable to the A.L.U. 3432). At the start of each 32-microsecond interval, the buffer 3410 contains port data for a specific port.

Figure 7:
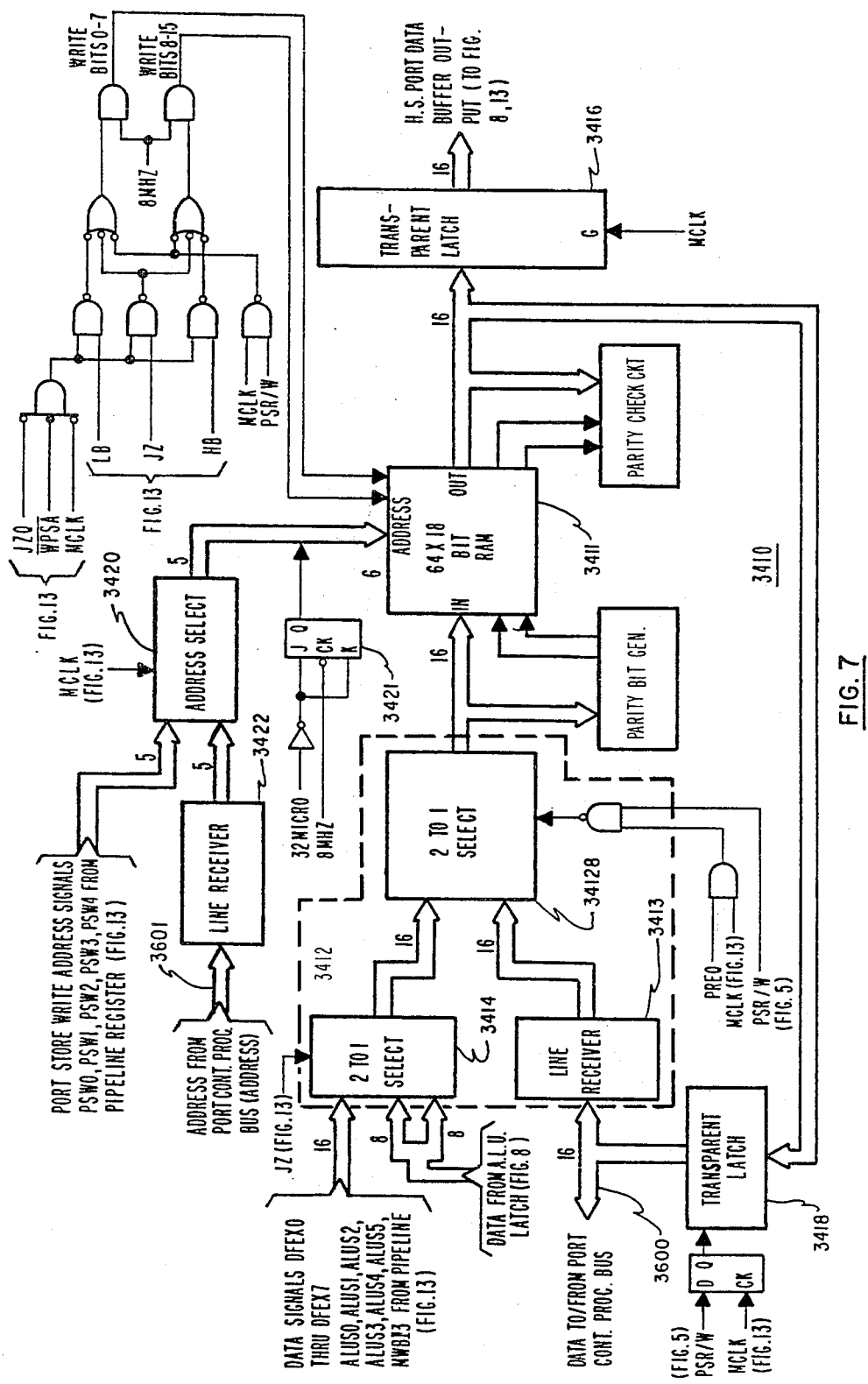
FIG. 7 is a logic diagram of the high speed port data buffer 3410 element of the port control processor 3400 in FIG. 6.
Figure 13:
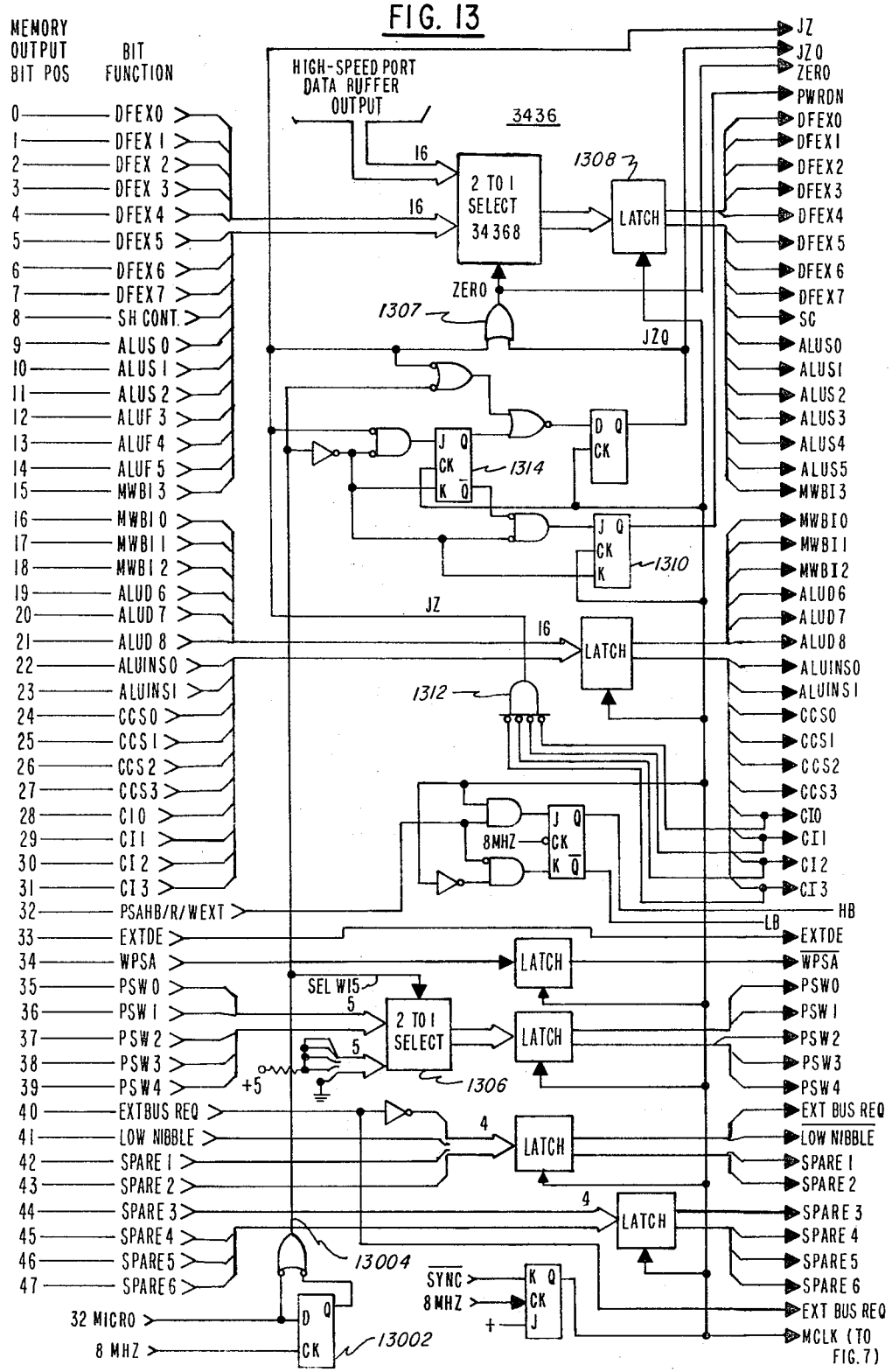
FIG. 13 is a logic diagram of the pipeline register 3436 for the port control processor 3400 (FIG. 6)

With reference to FIG. 2, word 15 within that portion 33502 of the high-speed buffer 3410 accessible by the port control processor 3400 contains the address of the first instruction in the microprogram sequence that is to be executed at the start of each 32 microsecond interval. With reference to the bottom of FIG. 13, at the start of each 32 microsecond interval, a 32 MICRO timing signal (generated by the timing signal generator 50000 shown in FIG. 5) enables an 8 MHZ clock signal (from the same source) to set a flip-flop 13002 and to cause the flip-flop to generate a SELW15 (select word fifteen) signal on a line 13004. The SELW15 signal causes a selector 1306 to strap the four pipeline register address signals PSW0 to PSW3 high and the signal PSW4 low, thereby generating the address signal "01111$_2$" or "fifteen". This address signal is fed through the address select logic 3420 (FIG. 6) to the address input of the high-speed port data buffer 3410, and a JZQ pulse (derived from the SELW15 signal after a one-cycle time delay by logic shown in FIG. 13) flows through the logic shown in the upper right-hand corner of FIG. 7 and causes WRITE BITS 0-7 and WRITE BITS 8-15 signals to be terminated. The termination of these signals, together with the address "fifteen" presented to the address select 3420A, causes the microprogram address stored in the fifteenth word position (33502 in FIG. 2) within the port data field of the memory 341 (FIG. 7) of buffer 3410 to be gated into the transparent latch 3416 (FIGS. 6 and 7). With reference to FIG. 13, the JZQ signal passes through a gate 1307 and becomes a ZERO signal. This ZERO signal activates a 2-to-1 select logic 34368 (FIG. 13) to connect the output of the high-speed port data buffer latch 3416 (FIG. 7) to a latch 1308 (FIG. 13) at the pipeline register output so that the program address retrieved from the fifteenth port storage location appears as the output signals DFEX0 through MWBI3 at the pipeline register output (FIG. 13).

Figure 11:
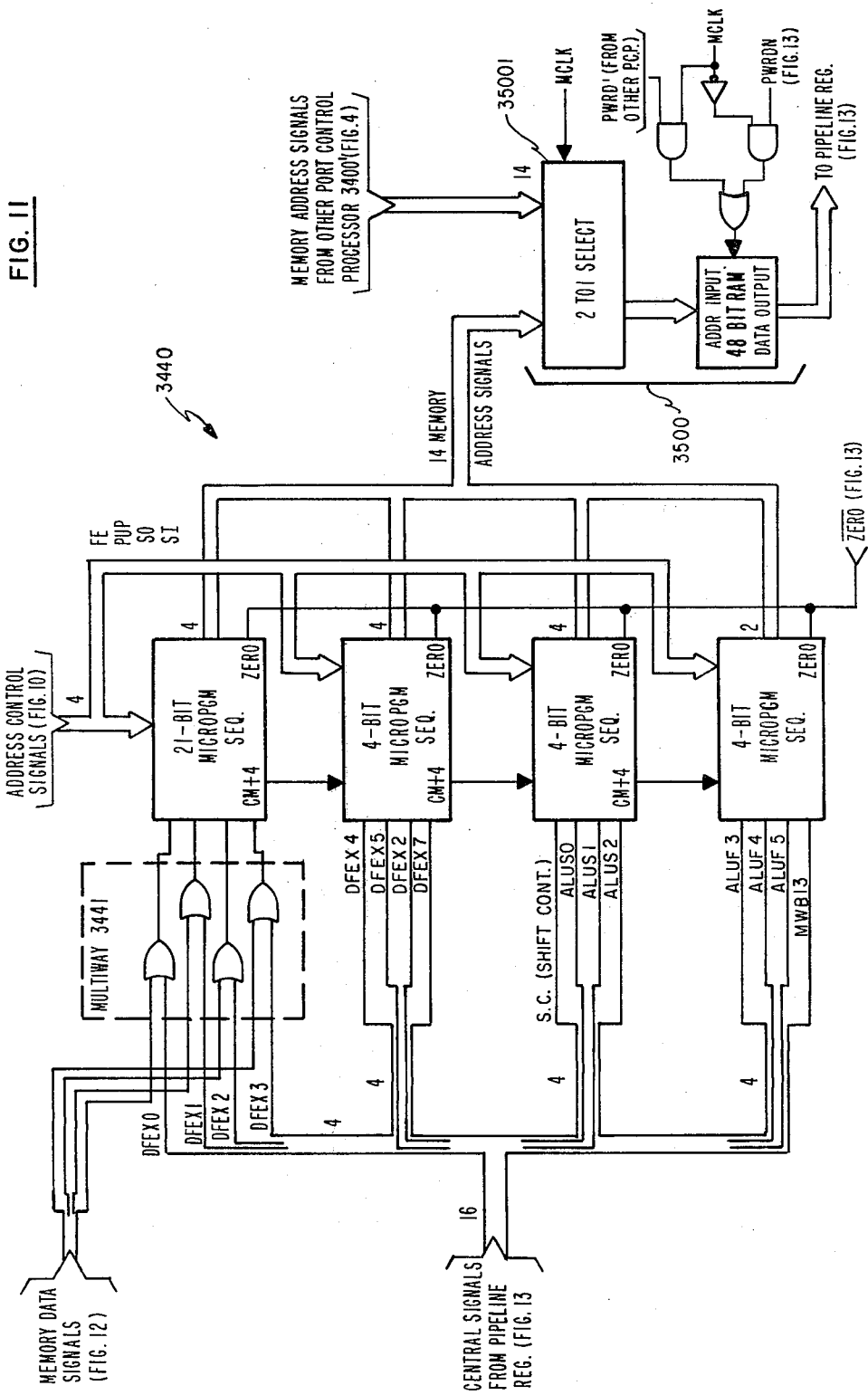
FIG. 11 is a logic diagram of the microprogram controller 3440 and block diagram of the instruction store 3500 of the port control processor 3400 (FIG. 6)
Figure 12:
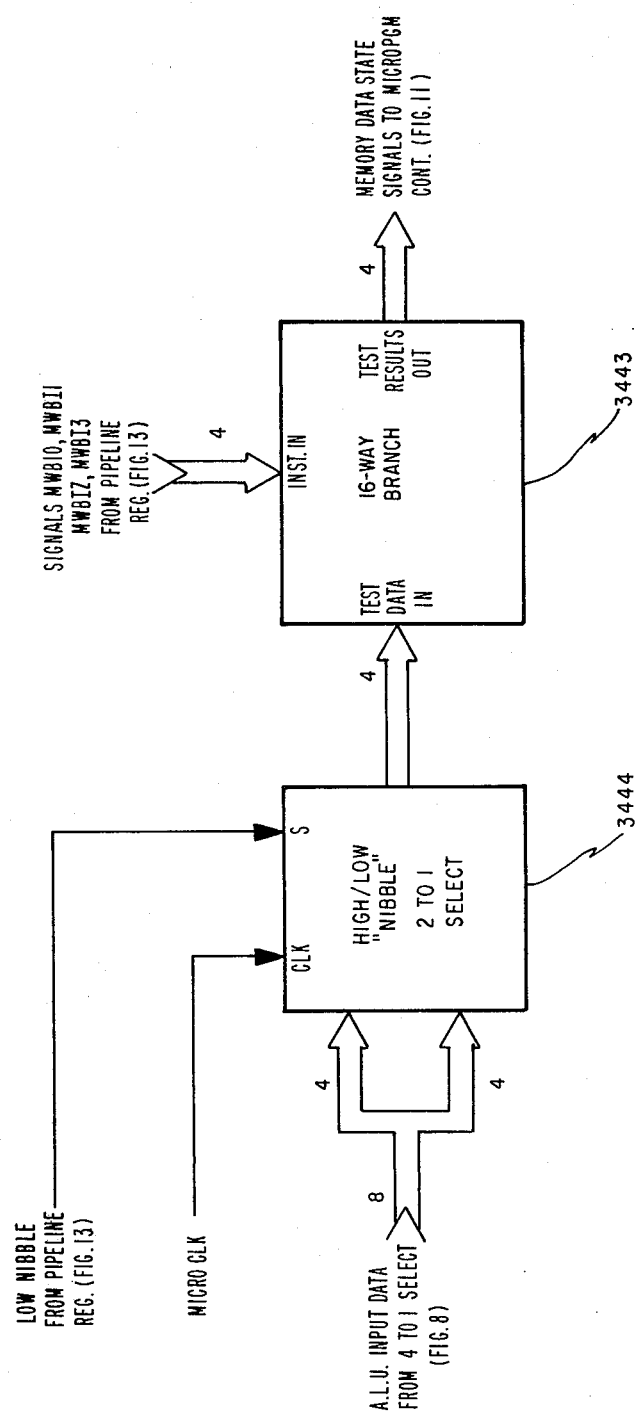
FIG. 12 is a logic diagram of the select 3444 and 16-way branch controller 3443 for the microprogram controller 3440 (see FIG. 6)

Just prior to the onset of the new 32 microsecond interval, the microprocessor microinstruction store 3500 (FIGS. 6 and 11) is "powered down" by the presence of a PWRDN signal (generated in FIG. 13 and applied to the memory in FIG. 11). The powered down microinstruction store presents all "0"s on memory output leads 0 to 47 entering the pipeline register (FIG. 13). Since leads CI0 to CI3 are thus all "0"s, the command "0000" or "jump to zero" appears to be coming from the memory. Accordingly, just prior to the beginning of a new 32 microsecond interval, the microprocessor is repeatedly executing a "jump to zero" command and is repeatedly attempting to extract an instruction from microinstruction memory loction zero. As is noted below, the "ZERO" signal is initiated wherever a "jump to zero" command is executed as the very last command in a microprogram sequence.

When the 32 MICRO signal signals the beginning of the next 32 microsecond interval, this signal initiates the SELW15 signal, as described above, and thus gates the sixteen pipeline register output signals DFEX0 through MWBI3 away from the microinstruction store output and connects these signals to the address retrieved from the fifteenth location within the high-speed port data buffer 3410. This address is the address of the next instruction that is to be executed, it will be remembered. At the same time, the SELW15 signal terminates the PWRDN signal by setting a flip-flop 1310 (FIG. 13), so power is once again applied to the microprocessor's memory. The next attempt to "jump to zero" thus succeeds, and the instruction stored in location zero is retrieved from the microinstruction store 3500 and is executed. But note that the selection logic 34368 (FIG. 13) blocks the lowest 16 bits of this instruction and substitutes therefor the address of the next instruction to be executed, which address is retrieved from the fifteenth word of the port data within the buffer 3410. The instruction retrieved from the zeroth memory location is an "unconditional jump" instruction (bits 28 to 31 set to 0011 "conditional jump"; bits 24 to 27 set to 1110 "unconditional") that causes the sixteen least significant bits in the instruction to be taken as the address of the next instruction to be executed. But as has been explained, the address retrieved from the fifteenth word within the port data has been effectively substituted for the lowest sixteen bits of this instruction by the select logic 34368. Accordingly, the next instruction executed by the port control processor 3400 is the first instruction in the program that is to process the port data.

To briefly summarize the above, prior to the end of each 32 microsecond interval, the microinstruction store 3500 is powered down, and the port control processor repeatedly executes "jump to zero" instructions. The timing pulse 32 MICRO powers up the memory. The last "jump to zero" instruction is then executed, and the "unconditional jump" instruction retrieved from location zero is executed having grafted into it the program address retrieved from the fifteenth port data word. Accordingly, the proper program commences execution with the third memory cycle. Only two memory cycles are required for the processor to commence processing the data for a new port. Of the 128 possible memory cycles per 32 microseconds, only two are lost in commencing program execution, and one more is lost in terminating program execution, so well over 100 microinstructions may be executed every 32 milliseconds for each port.

After a microprogram has run to completion or has reached a suitable point at which to halt temporarily, the microprogram executes a "jump to zero" instruction with the "jump to zero" code "0000" in bit positions 28 to 31. Bit 34, which initiates a write to the high-speed port buffer 3410, must be a "1" bit, and the address of word fifteen (01111$_2$) must occupy bit positions 35 to 39 to address the fifteenth location in the buffer 3410. Bits 0 to 15 of this instruction must contain the address of the first instruction in the microprogram sequence that is to be initiated in 32 milliseconds when the data for this same port is processed again.

This instruction causes the proper program instruction address to be stored in word 15 of the port data within the buffer 3410 (FIGS. 6 and 7). It also "jumps to zero", but a gate 1312 in FIG. 13 senses the "0000" code on the signal leads CI0, CI1, CI2, and CI3 (corresponding to instruction bits 28 to 31), and the gate 1312 generating a "JZ" ("jump to zero") signal. The JZ signal indirectly sets the flip-flop 1310 (via the one-cycle time-delay flip-flop 1314) and initiates the "PWRDN" signal that powers down the microinstruction store until the start of the next 32 microsecond period. The JZ signal also passes through the gate 1307 and becomes the ZERO signal, thereby causing the SELECT logic 34368 to connect the signal lines DFEXC0 through MWB13 to the high speed port data buffer output even before the onset of the JZQ signal. The ZERO signal also flows to the microprogram controller 3440 (FIG. 11), forcing it to generate the microinstruction store 3500 address code "zero" until the memory powers up again and the "zeroth" instruction is retrieved at the start of the next 32 microsecond interval.

To again briefly summarize, the final instruction executed by every microprogram sequence is a "jump to zero" instruction that loads the starting address of the next microinstruction sequence into word 15 of the port data just processed. The port control processor then idles until the 32 MICRO clock signal at the start of the next 32 microsecond interval causes an "unconditional jump" instruction to be retrieved from memory location zero, to be combined with the starting address of the program that is to process the data for the next port (retrieved from word 15 of the next set of port data), and to be executed as a "jump" into the next microprogram sequence.

The "jump to zero" instruction that terminates program execution causes the JZ signal to actuate a 2-to-1 select logic 34128 (FIG. 7) to route the sixteen least significant bits of the "jump to zero" instruction (pipeline register signals DFEXO to MWBI3) into the data input of the high-speed port data buffer 3410 memory 3411. Bits 35 to 39 of the same instruction (pipeline register signals PSW0 and PSW4) are applied to the address input of the buffer 3410 (through the address select 3420) as the address "15", and the JZ signal (FIG. 15) together with the WPSA (write port store address) signal generated by bit 34 of the instruction together cause the logic in the upper right hand portion of FIG. 7 to generate the signals WRITE BITS 0-7 and WRITE BITS 8-15 that cause the processor to write the least significant sixteen bits of the instruction into location fifteen within the buffer 3410 memory 3411. In this manner, the address of the next program to be executed is transferred from bit positions 0-15 of the "jump to zero" instruction into the fifteenth location within the port data buffer 3410 before the port data is returned to storage in the port data store 3300 (FIG. 5).

The port control processor 3400 alternately retrieves microinstructions and executes these instructions. Its basic clock rate is eight megacycles, driven by 8MHZ clock pulses generated by the timing signal generator 50000 (FIG. 5). A four megacycle signal, MCLK, generated in FIG. 13, differentiates the memory-access period (when MCLK or "memory clock" is high ) from the execution period (when MCLK is low).

The MCLK signal coordinates the synchronous sharing of the various memories within the two port control processors 3400 and 3400'. The two processors operate out of phase with each other, so one is accessing the instruction store 3500 while the other executes an instruction and vice versa. FIG. 11 illustrates how the address input to the memory 3500 is shifted back and forth between the two processors by the MCLK signal driving a select logic 35001. FIG. 11 also illustrates how the memory 3500 power-down signal must be accepted from alternate processors through a gating arrangement driven by the MCLK signal. In FIG. 13, the latches at the output of the pipeline register are all strobed by the MCLK signal, so the latches accept from the 48 memory output lines only data destined for the port control processor that they control.

Figure 8:
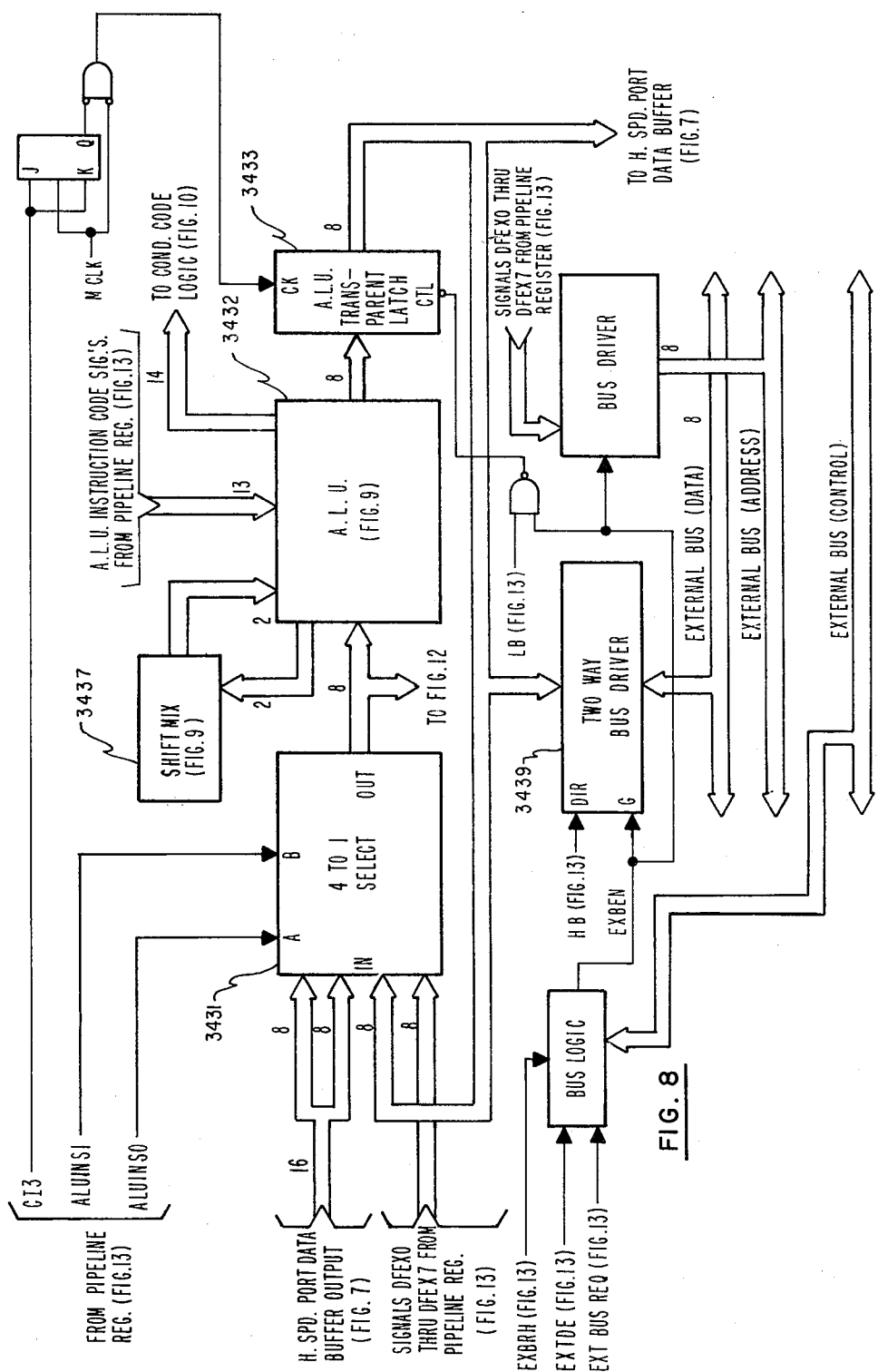
FIG. 8 is a logic diagram of the selector 3431 and of the external bus interface 3439 both of which are elements of the port control processor 3400 (FIG. 6)
Figure 9:
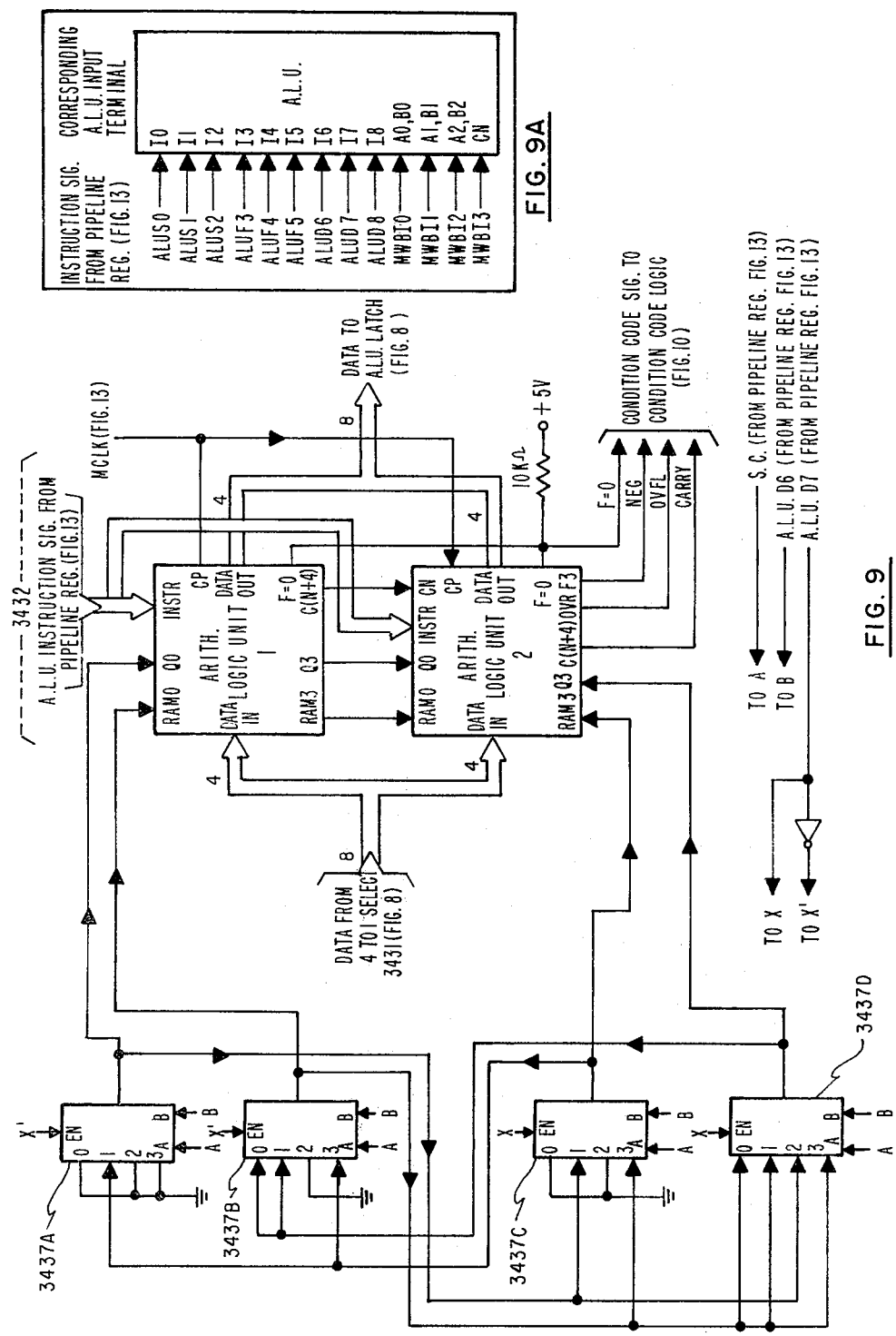
FIG. 9 is a logic diagram of the arithmetic logic unit 3432 and the shift multiplexer 3437 elements of the port control processor 3400 (FIG. 6)

In FIG. 7, the MCLK signal is also used to grant the port control processor A.L.U. 3432 (FIG. 6) and the port data store 3300 (FIG. 5) alternate access to the high speed port data buffer 3410. While the port control processor is executing an instruction, the MCLK signal is absent. This absence enables the pipeline register signals LB (low bits), HB (high bits) and JZ (jump to zero) to flow through the gates shown in the upper left-hand corner of FIG. 7 and to control the writing of data into the buffer 3410 memory 3411. The MCLK signal also forces the selection logic 3420 to select the five address bits from the pipeline register. Simultaneously, the absent MCLK signal and the absent JZ signal together force the select logics 34128 and 34124 to select the data inputs for the buffer 3410 that flow from the A.L.U. latch 3433 (FIG. 8). Likewise, the MCLK signal strobes the latch 3416 only when data selected by the port control processor is presented at the memory 3411 output.

Figure 14:
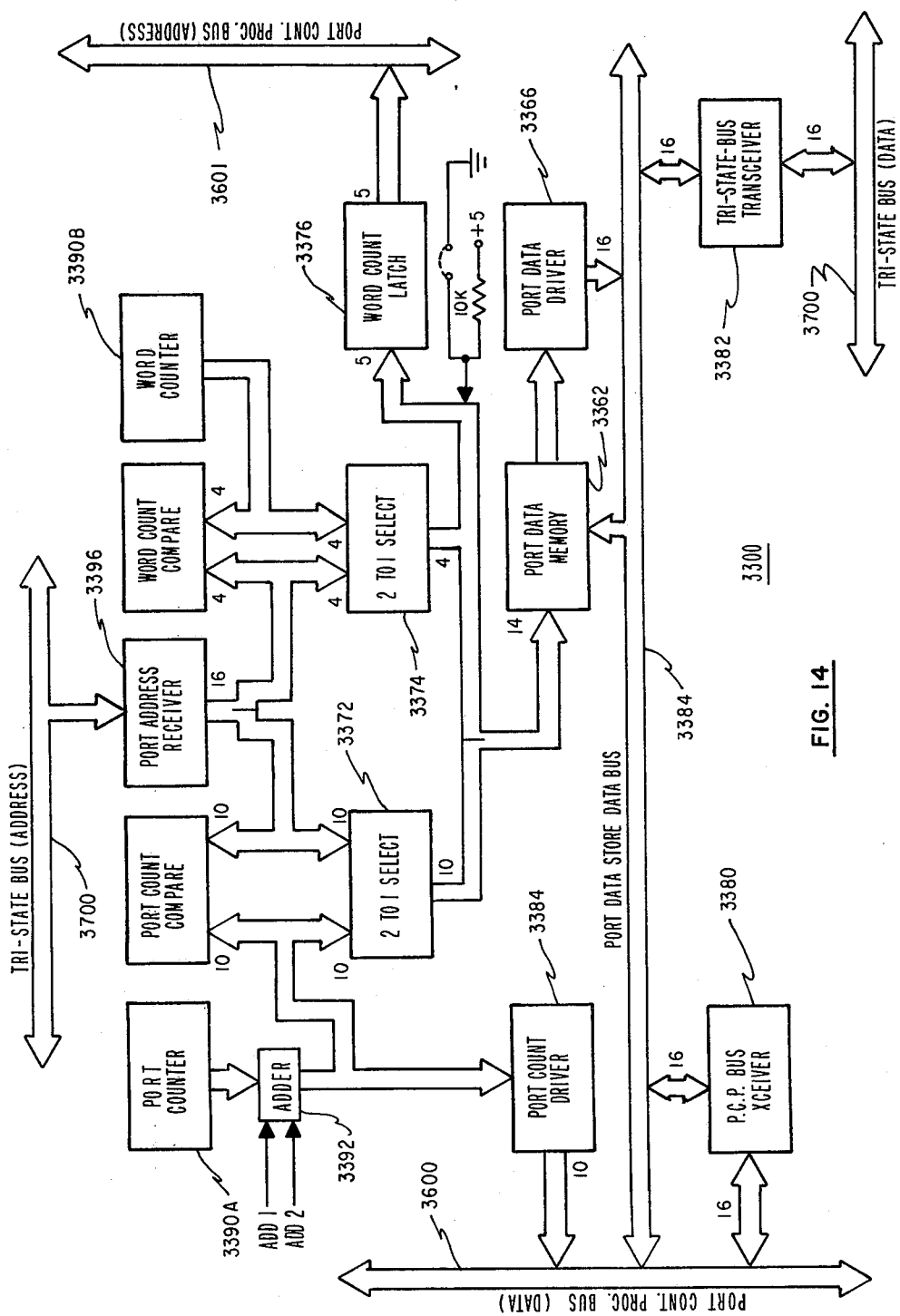
FIG. 14 is an overview block diagram and partial logic diagram of the port data store 3300 that forms an element of the port data storage network 405 in FIG. 1A.

When the MCLK signal is in its other state, everything is changed. A PSR/w (port store read or write) signal generated by logic associated with the port data store 3300 flows through the logic in the upper left-hand corner of FIG. 7 and determines whether data is read into or out of the port data buffer 3410, and this same signal determines whether a latch 3418 is transparent or presents data to the port control processor data bus. The MCLK signal forces the address select logic 3420A to select address signals received from the port control processor address bus that originate in word count latch 3376 within the port data store 3300 (FIG. 14). Accordingly, whenever the port control processor is retrieving a microinstruction from its instruction store, the buffer 3410 is disconnected from the port control processor and is connected instead to the port control processor bus and through it to the port data store 3300 and also to the sense and control data memories 32100 and 32200 (FIG. 5). Accordingly, the port data store and the sense and control data memories have just as free access to the buffer 3410 as does the port control processor. During each 32 microsecond interval, while the port control processor is processing the port data for the port whose data occupies one-half of the buffer 3410, the control logic 3301 (FIG. 5) associated with the port data store accesses the other half of the buffer 3410, removing the data for the port just processed from the other half of the buffer 3410 and transferring this data into the port data store 3300 and into the control data memory 32200, while simultaneously retrieving the data for the next port to be processed from the port data source 3300 and from the sense data memory 32100 and transferring this data into the other half of the buffer 3410.

Only five address leads (for addresses 0 to 31) flow from the address select logic 3420 (FIG. 7) into the buffer 3410. A sixth address lead, which determines which half of the buffer is accessed, is driven by a flip-flop 3421 that is driven by the 8 megacycle clock signal. The output of the flip-flop 3421 is identical in timing and phase to the MCLK signal, so the flip-flop 3421 makes one-half of the memory available when the port control processor has control of the buffer 3410 and the other half available when the port control processor bus and the port data store have control of the buffer 3410. Accordingly, the port control processor examines and manipulates the data for one port stored in one-half of the buffer while the port data store accesses the other half, retrieving and storing away the data for the port just processed and fetching and feeding into the buffer the data for the next port to be processed. At the end of each 32 microsecond interval, the 32 MICRO signal applies a momentary low-level pulse to the J and K inputs of the flip-flop 3421 and thereby causes one eight megacycle pulse to be skipped. The skipping of one such pulse reverses the comparitive polarities of the flip-flop 3421 output and the MCLK signal and thereby reverses which half of the buffer 3410 the port control processor and the port data store respectively can access. Accordingly, the port control processor immediately begins processing the newly entered port data, and the port data store immediately begins transferring out the port data just processed and transferring in the port data to be processed next.

The port data may be thought of as a "macroinstruction" that initiates the execution of a single micro-instruction sequence appropriate to the present condition of the corresponding port. If a micro-instruction sequence cannot be completed prior to the end of the allowed 32-microsecond interval, the address of the next micro-instruction in the sequence to be executed is gated from the pipeline register 3436 into the port data set within the buffer 3410 so that the address of the micro-instruction next to be processed is saved. The next time this same port data is processed, this microinstruction address is gated back into the microprocessor, and the micro-instruction sequence is reinitiated as if there had been no interruption. To facilitate such interruptions, all temporary values may be stored within the buffer 3410, rather than within the A.L.U. 3432 internal registers.

The multiway logic 3441 (FIG. 6 and FIG. 11) is an OR logic network that allows signals from either the pipeline register 3436 or from the 16-way branch 3443 to be fed into the four least significant address bit inputs of the microprogram controller 3440. The 16-way branch 3443 is an Am 29803 16-way branch control unit manufactured by Advanced Micro Devices, Inc. and is designed to be used with the Am2911 microprogram sequencer. In the port control processor, the 16-way branch 3443 and the 2-to-1 select 3444 together select combinations of bits presented at the 8-bit output of the A.L.U. input data select logic 3431 for use in incrementing the low order bits of the address within the microprogram controller 3440 to control microinstruction branching.

The shift multiplexers 3437 (shown in detail in FIG. 9) are conventional "add-ons" to the Am2901's that provide buffer space for various types of linear and circular (or "rotational") shifts required in bit manipulation. A detailed explanation of the role they play may be obtained from Advance Micro Devices, Inc. or from general literature on the construction of bit-slice microprocessors.

Figure 10:
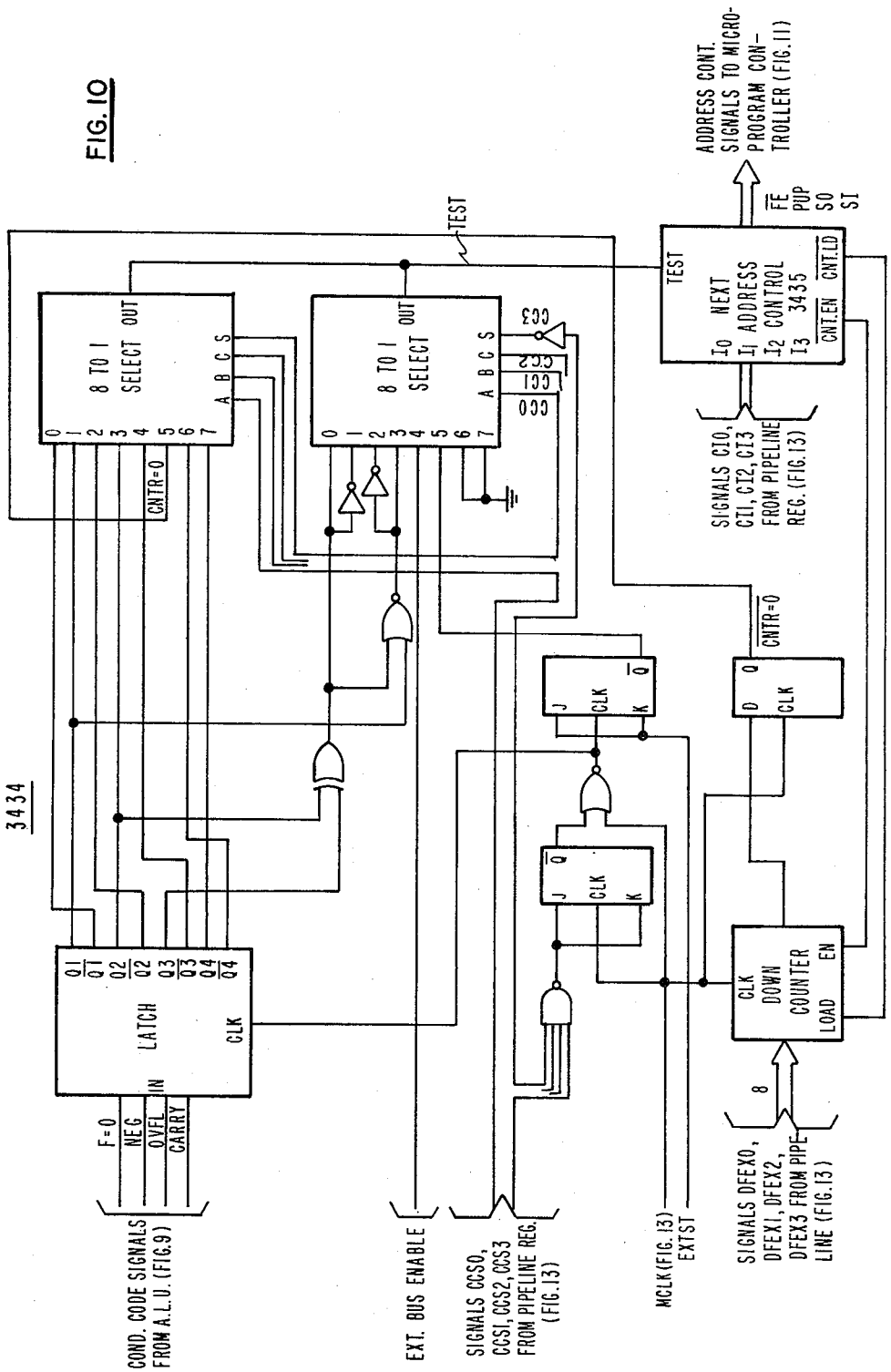
FIG. 10 is a logic diagram of the condition code logic 3434 of the port control processor 3400 (FIG. 6)

The condition code logic shown in FIG. 10 is somewhat more complex than a standard microprocessor condition code logic to allow tests to be performed for a variety of conditions relevant to telephony port control. This logic samples the condition code signals generated by the A.L.U. 3432 (FIG. 9) and generates a "TEST" signal indicating whether the condition tested for is "present" or "absent." The next address control 3435 is an Am29811 next address control unit manufactured by Advanced Micro Devices, Inc. for use with their Am2911 microprogram sequencers (microprogram controller 3440 in FIG. 11). This circuit is conventional except that it is customized to perform certain condition test with single micro-instructions that would require multiple instructions in a conventional microprocessor through utilization of the hardware logic shown in FIG. 10.

The micro-instruction store 3500 (FIG. 11) is conventional but is enlarged to hold longer-than-usual sequences of micro-instructions (since there are no macroinstructions). The memory is 16K by 48 bits in size. It is also shared by two port control processors operating on different clock phases so as to interleave their memory access cycles, as has been explained.

The pipeline register shown in FIG. 13 is relatively conventional except that it has been modified as has been described to facilitate the hardware-controlled initiation at the start of each 32 microsecond port data processing cycle, and it has been further modified to facilitate the hardware sensing of the "jump to zero" instruction that terminates program execution. A conventional pipeline register would be simply a 48-bit latch to hold each microinstruction and to distribute its bits as signals. A number of control logic gates and flip-flops that participate in switching between port data sets have been included in FIG. 13.

Note that while the two port control processors 3400 and 3400' are identical in most respects, they must differ in that the MCLK signal of one is the inverse of the MCLK signal for the other to insure proper sharing of the common instruction store 3500.

C. The Port Data Store

With reference to FIG. 14, the port data store 3300 is a storage area for data relating to each individual port. It provides direct access to the port data for the call control processor subsystem 408 over the tri-state data and address busses 3700, and it is connected to the high speed port buffer 3410 of the port control processor 3400 (FIGS. 5 and 6) by the port control processor data 3600 and address 3601 busses. It includes port and word counters 3390 A and 3390B that control the continuous transfer of port data between the port data memory 3362 and the high-speed buffer 3410 within the port control processor 3400 over the port control processor address 3601 and data 3600 buses. Note that only the word counter 3390B address output needs to be routed to the port control processor address bus to route port data to the proper locations within the buffer 3410. This 4-bit address passes through the select logic 3374 and is stored in a word count latch 3376 for presentation to the address bus 3601 along with a fifth address line that is strapped to ground or to a positive potential (to differentiate the two possible port data store 3300 circuit boards that may be used in constructing the present invention—each port data store board provides sixteen 16-bit words of port data storage for each of 1,028 ports, and two boards provide thirty-two words for each of 1,028 ports). Data is presented to and is received from the data bus 3600 by the port control processor bus transceiver 3380 (FIG. 5) and is then passed to the memory 3362 over an internal port data store data bus 3384. Data flowing from the memory 3362 is stored in a port data driver latch 3366 for presentation to the bus 3384, the transceiver 3380, and the port control processor bus 3600.

The port counter 3390A indicates what port is being serviced. Its output flows through an adder 3392 having additional inputs to which an "ADD 1" or an "ADD 2" signal may be supplied to add one or two to the port address count. By fluctuating the "ADD 2" signal, the port data store control logic can hold the port and word counters 3390 at a constant count, retrieve a 16-bit word from one word location within the high speed port data buffer 3410 (FIGS. 5, 6, and 7), store that word in the port data memory 3362, add "2" to the port count by actuating the signal "ADD 2", retrieve a 16-bit word from the memory 3362, and store that word in the buffer 3410. The word counter is then incremented, the ADD 2 signal terminated, and the above process is repeated until all the data for one port has been retrieved from the buffer 3410 and stored in the memory 3362 and all the data for a second port has been transferred into the buffer 3410. At the end of 32 microseconds, one is added to the port count, and the entire process is repeated again, over and over. The output of the adder 3392 is combined with the word count to form the address signals for the port data memory 3362. The port count output of the adder is also gated through the port count driver 3384 to the port control processor data bus 3600 for transfer into the EN register 32500 within the demultiplexer, filter and multiplexer 3200 (FIG. 15) where the port count identifies to the demultiplexer, filter, and multiplexer 3200 the identity of the port being serviced when control bits are retrieved from or sense bits delivered to the buffer 3410.

An address receiver 3396 and a data transceiver 3382 provide for the interchange of information between the call control processor subsystem 408 and the port data store over the tri-state bus 3700. An address signal placed in the receiver 3396 is gated through the select logic 3372 and 3374 to the port data memory 3362 to control the transfer of information between the port data memory and the bus transceiver 3382 over the port data store data bus 3384.

D. The Demultiplexer, Filter, and Multiplexer

Figure 15:
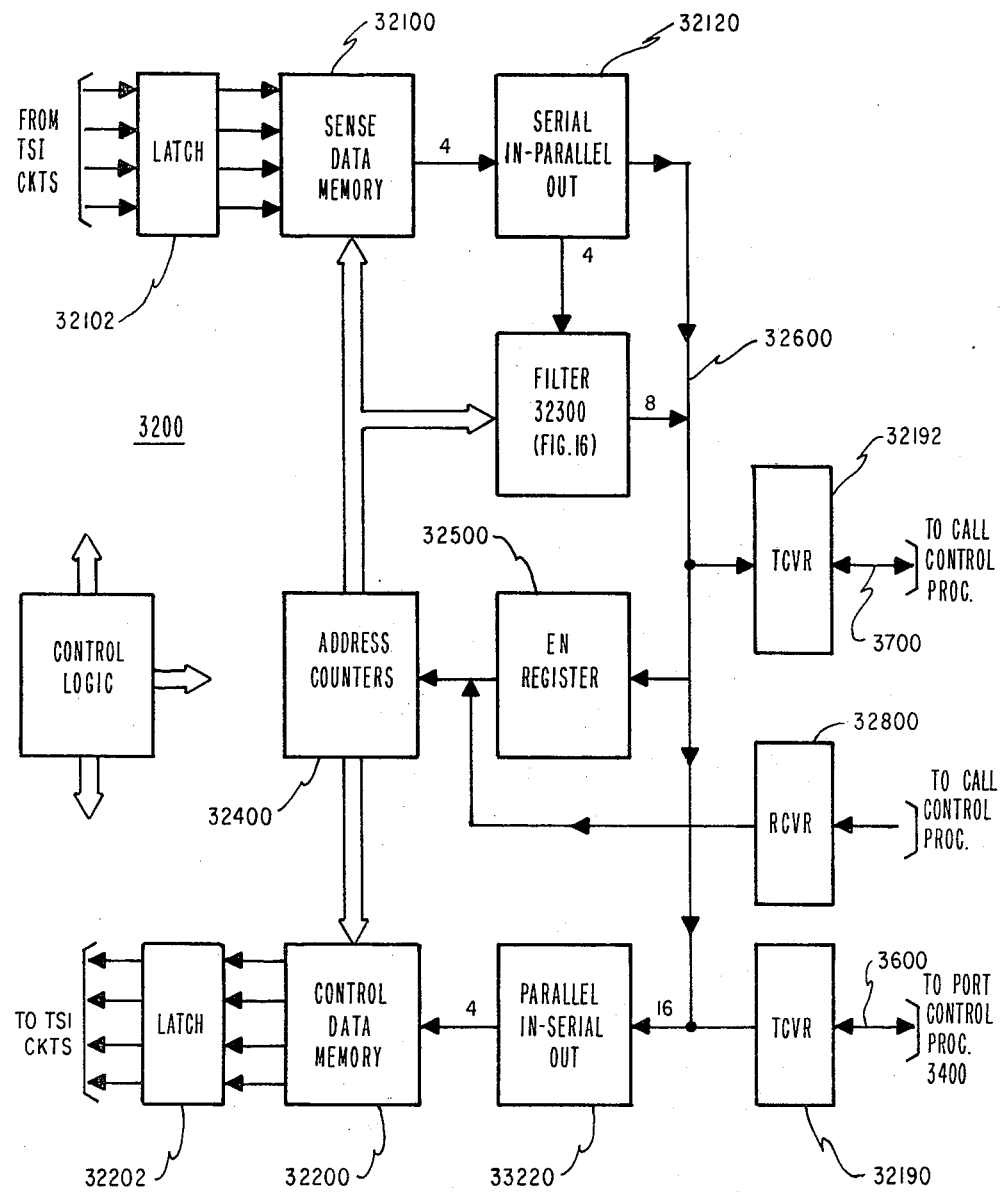
FIG. 15 is a block diagram of the demultiplexer, filter, and multiplexer 3200 of FIG. 1A.

FIG. 15 illustrates the details of the sense signal demultiplexer, the sense fast-bit signal filter, and the control signal multiplexer 3200. Sense signals flowing from the TSI circuits are captured by a 4-bit latch 32102 and are presented to a sense data random access memory 32100 for storage. The memory 32100 address signals are generated by a series of address counters 32400 having output leads interchanged in such a manner that the sense data is sorted out or "demultiplexed" as it is entered into the memory 32100. At other intervals during the system timing cycle, the address counters 32400 have their output leads fed directly to the sense data memory so that the data may be clocked out of the memory and into a serial-in parallel-out logic circuit 32120 for presentation to a signal bus 32600 that is connected to the port control processor bus 3600 by a transceiver 32190. Accordingly, sense data is demultiplexed and is periodically sent over the port control processor bus 3600 for storage within the sense data locations within the buffer 3410 (FIGS. 5, 6, and 7) of the port control processor 3400.

Address information (derived from the port counter 3390A in FIG. 14) identifying which port is being serviced is gated onto the port control processor bus 3600 and latched into the EN register 32500 for presentation to the memories 32100 and 32200 to control the data transfers. The address in the EN register 32500 displaces the output of the address counters 32400 for a brief moment while data is transferred to or from the transceiver 32190. This address information enables sense data and control data relating to a specific port to be transferred between the memorys 32100 and 32200 and the buffer 3410 (FIG. 7).

Control data from the buffer 3410 (FIG. 7) is gated over the port control processor bus 3600 through the transceiver 32190 for storage within the parallel-in, serial-out logic 33220. This control data is then fed serially into the control data memory 32200 under the control of sequential address signals generated by the address counters 32400. At other moments within the system timeframe, a properly-scrambled set of the address signals from the counters 32400 gates sets of four bits out of the memory 32200 and presents them to the latch 32202 for presentation to the TSI circuits and transmission in time-multiplexed form back to the individual ports.

The call control processor subsystem may supply an address to a receiver 32800 and then, via the tri-state bus and a data transceiver 32192, retrieve sense data from or submit control data to any port. The address in the receiver 32800 then displaces the output of the address counters 32400 for a brief moment.

E. The "Fast-Bit" Filter

Figure 16:
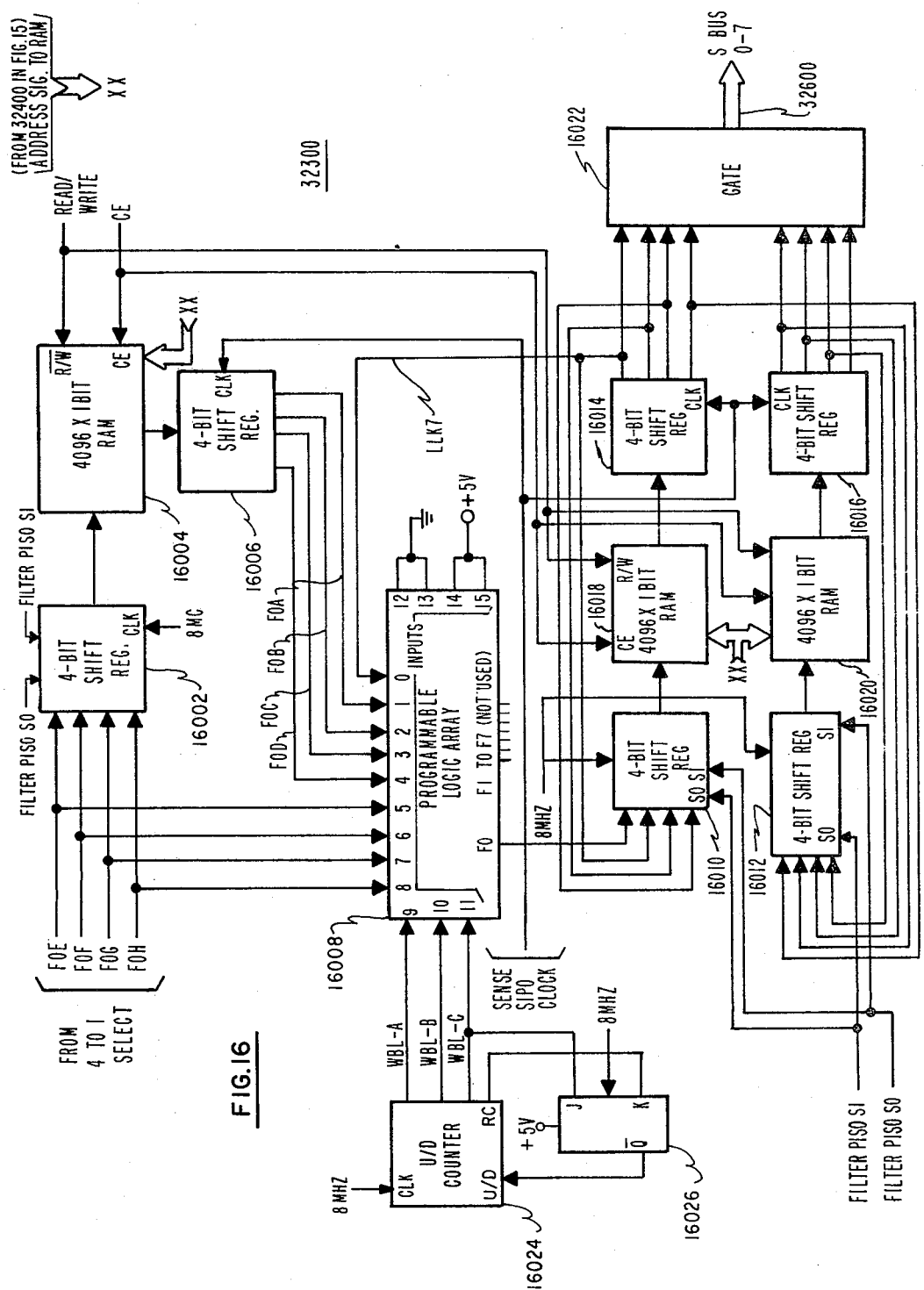
FIG. 16 is a logic diagram of the filter 32300 element of FIG. 15.

FIG. 16 illustrates the details of the "fast-bit" filter 32300 (FIGS. 4,5, and 15). This filter is a digital filter that samples the incoming "fast-bit" sense signals at a one millisecond sampling rate, averages their fluctuations over four milliseconds, and presents eight filtered fast-bit signal samples every 32 milliseconds for storage in the buffer 3410 (FIG. 7) within the port control processor 3400 (FIG. 6).

Sets of four fast-bit signals flow into a 4-bit shift register 16002 from which they flow into a 4096×1 bit random access memory 16004 from which they flow into a 4-bit shift register 16006 4 milliseconds later. The four incoming signals FOE, FOF, FOG, and FOH indicate the state of a fast-bit signal during each of the immediately preceding one-millisecond intervals, and the four outputs of the shift register 16006 represents the state of that same signal during each of the four one-millisecond intervals beginning four milliseconds previously. Accordingly, a programmable logic array 16008 receives as its inputs one through eight the state of a fast-bit signal at eight points in time spaced one millisecond apart. The logic array 16008 selects four adjacent input signals (as will be explained at a later point) and averages them to generate at FO a high-level output if three or four are high, or a low-level output if three or four are low. If two are high and two are low, the logic array 16008 examines its input zero to see in what state this "fast-bit" signal was the last time it was filtered, and the array 16008 causes the new signal state at FO to match the previous signal state presented at input zero. Accordingly, digital filtering over a four-millisecond time interval is achieved with a Schmitt trigger-like tendency to hold with the previous value in the face of an equal number of high- and low-level inputs.

The filtered signal at FO is fed into a network of shift registers 16010–16016 and random-access memories 16018 and 16020 that are interconnected as shown to form, in essence, eight 1,028-bit shift registers interconnected end-to-end to form an eight-stage 8,192-bit shift register. The outputs of all eight stages are presented to a gate 16022 for presentation to the bus 32600 (FIG. 15) whereby the eight filtered fast bits presented to the gate 16022, and representing eight filtered representations of a "fast-bit" signal's state at time intervals spaced apart by four milliseconds, may be transferred simultaneously into the buffer 3410 shown in FIGS. 6 and 7 (over the port control processor bus 3600 and through the transceiver 32190 in FIG. 15 and the data select 3412 in FIG. 6) for use by the port control processor 3400 (FIG. 6).

The output of the first 1,028 bit stage is fed back to the zeroth input of the logic array 16008 as a "tie-breaker" signal that causes a signal to be perceived as stable (or unfluctuating) if the one-millisecond signal samples are evenly split between high and low levels, as has been explained. Accordingly, the filter 32300 gives some immunity to noise and transients and has a slight "Schmitt-trigger" characteristic.

If a fast-bit signal fluctuated at precisely or almost precisely a one-thousand-cycle rate, a resonance with the fluctuations of the system clock could cause undesirable fluctuations of the filtered output signal. In essence, the digital filter would function as a phase detector, generating a slowly fluctuating filtered output signal as the incoming sampled signal drifted into and out of phase with the system clock. To prevent such undesirable side effects, an up-down counter 16024 feeds its count output into inputs nine through eleven of the logic array 16008 and thereby controls, by the count value presented, which four of the eight input leads one to eight of the array 16008 are sampled for filtering. The counter 16024 counts up and down at a rapid rate, and its direction of count is reversed by the flip-flop 16026 at each end of its range so that it counts alternately up and down from zero to four and back to zero again. The four inputs selected by the programmable logic array 16008 therefore shift from 1–4 to 2–5 to 3–6 to 4–7 to 5–8 in dependence upon the count value that is presented by the counter 16024 when the output of the programmable logic array 16008 is sampled. By thus shifting the selection of signals sampled, the system is, in practical effect, varying the sampling frequency above and below a precise one-microsecond sampling rate so that resonance with a steadily-fluctuating incoming signal becomes a physical impossibility. Accordingly, such resonances cannot possibly occur and give false signal indications.

Figure 17A:
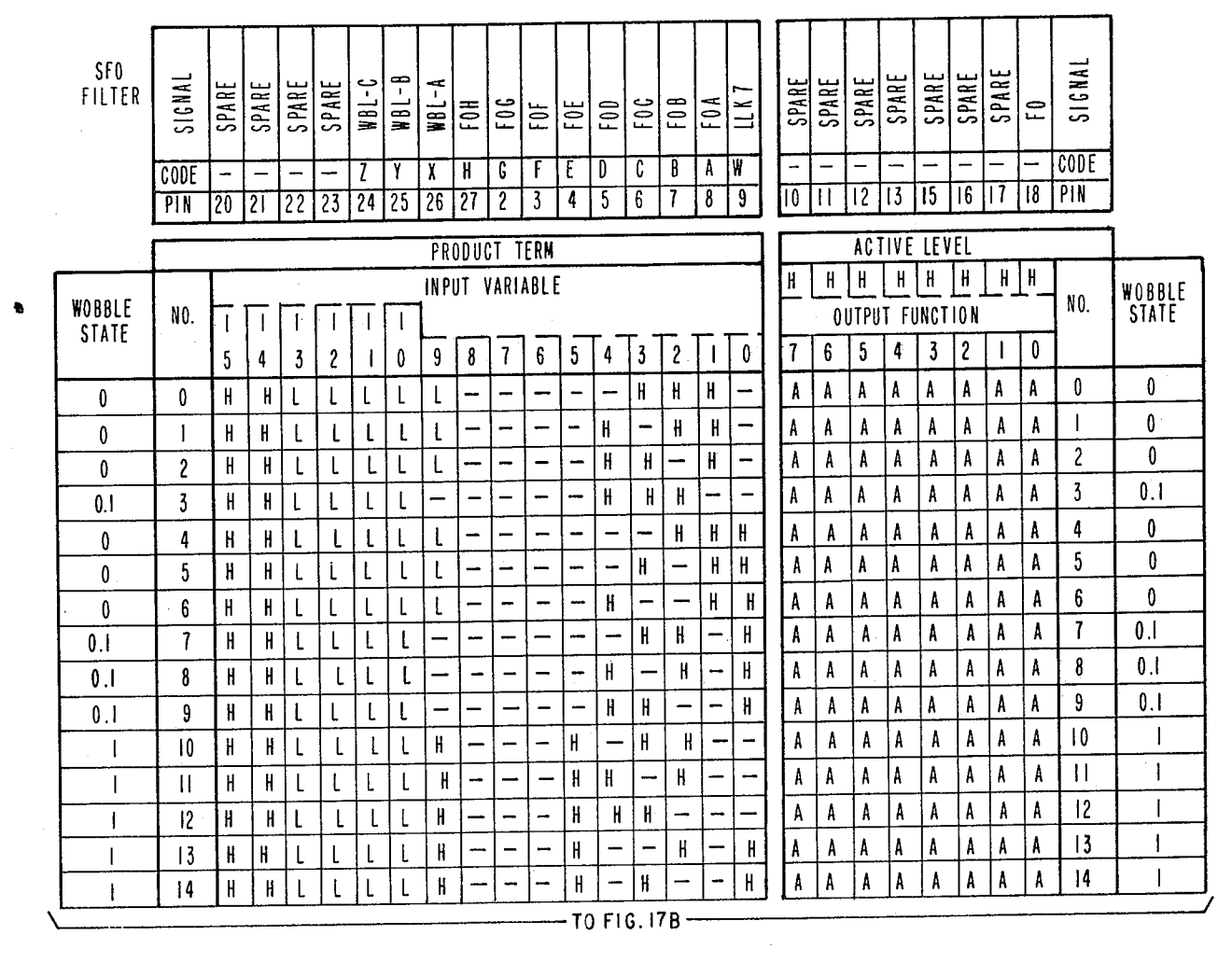
Figures 17A, 17B:
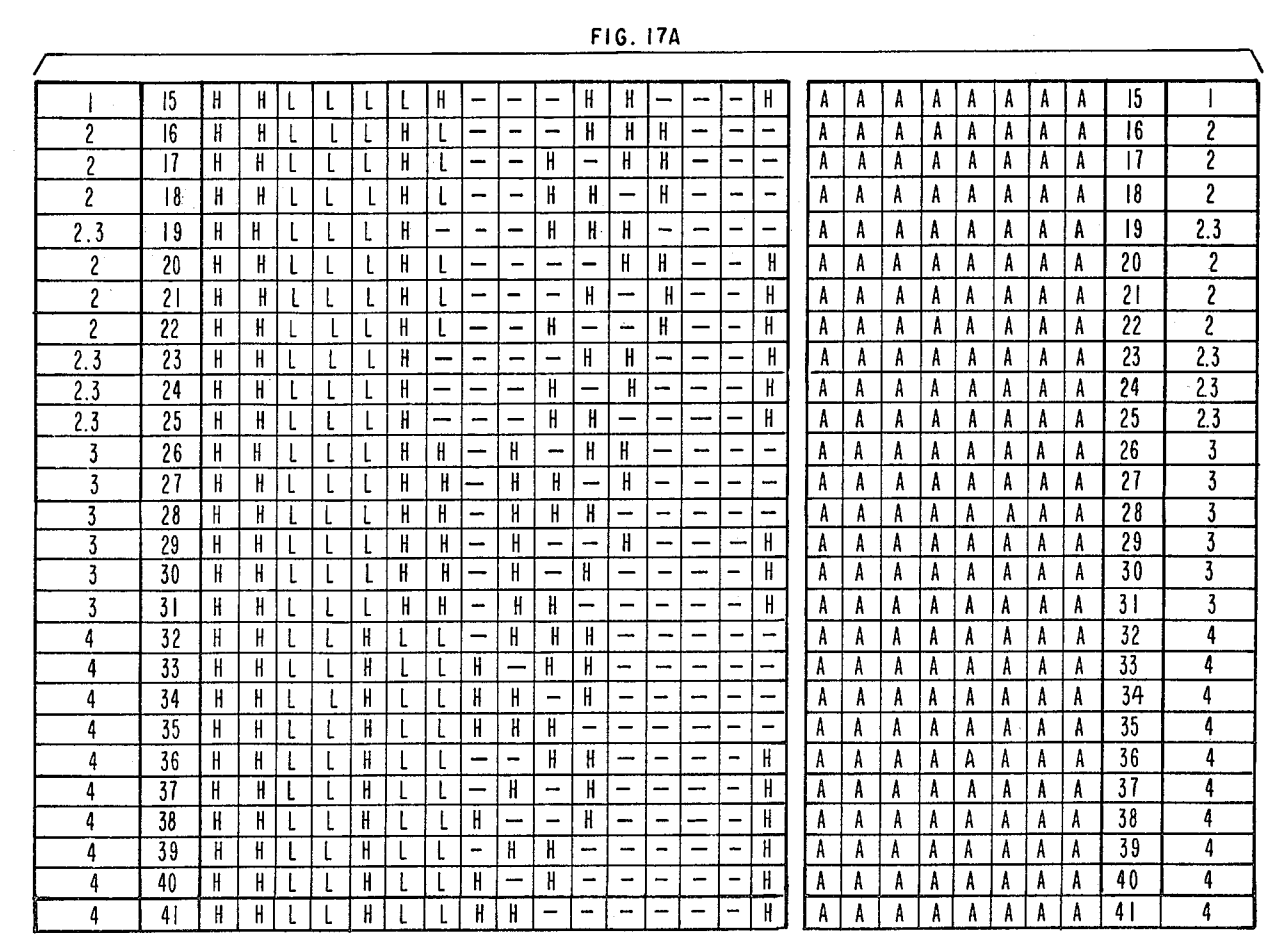

The programmable logic array 16008 is a combinational logic array programmed to give the input/output response characteristic described above. For example, the signetics 82S101 bipolar field-programmable logic array may be used. FIG. 17A and 17B illustrate how this particular logic array is actually "programmed" in the preferred embodiment of the invention.

The detailed description presented here was derived from over 250 sheets of logic drawings. Many conventional details relating to routine maintenance and error-correction functions have been omitted from this disclosure, but a good faith effort has been made to disclose in complete detail all elements that relates to the invention and that are not conventional. In the process of preparing this detailed description, it is to be expected that some minor errors in the drawings and in the detailed description will have appeared that careful proofreading will not have uncovered, but it should be obvious to anyone skilled in the art how to correct such errors.

While the preferred embodiment of the invention has been described, it will be understood that numerous modifications and changes will occur to those skilled in the art. It is intended to cover all such modifications and changes in the invention as defined in the claims appended to and forming a part of this specification.

What is claimed as new and desired to be secured by Letters Patent of the United States is:

1. An improved central office switching system comprising:
    a plurality of signal ports each generating sense data and responding to control data;
    a switching matrix interconnecting and establishing selective signal paths between said signal ports;
    a call control processor connecting to said matrix and controlling the selective establishment of signal paths by said matrix;
    a port event processor having an instruction memory into which instructions governing the processing of sense data and the generation of control data may be placed;
    a sense and control data conveyance network connecting said ports and said port event processor over which sense data is conveyed from each of said ports in sequence to said port event processor and over which control data is thereafter conveyed back to the port from which the corresponding sense data originated; and
    timing means interconnecting said port event processor and said conveyance network for synchronizing their operation such that sense data for each individual port is conveyed to said port event processor, is processed by any instructions in said port event processor, and the control data generated by said processing is conveyed back to said individual port at regular, fixed-length intervals;
    whereby the one who creates instructions for inclusion in said instruction memory may assume the port event processor is processing sense data and generating control data for only one port and may rely upon such instructions being executed at regular, fixed-length intervals.

2. A switching system as recited in claim 1 which includes:
    a source of periodic timing signals within said timing means, said signals demarking the beginning and end of port data processing timing intervals;
    a port counter connecting to said source of periodic timing signals and arranged to count said signals for generating port count signals;
    port count signal conveyance means connecting said port counter to said sense and control data conveyance network for enabling said port count signals to determine which port has its sense data presented to and its control data received from said port event processor during each port data processing timing interval defined by said periodic timing signals; and
    instruction execution initiation means within said port event processor connecting to said source of periodic timing signals for initiating the execution of instructions within said port event processor instruction memory in response to said periodic timing signals.

3. A switching system in accordance with claim 2 which includes:
    a sense data memory within said sense and control data conveyance network:
    a first sense data conveyance mechanism within said sense and control data conveyance network connecting said signal ports to said sense data memory and conveying at least some sense data samples from each port into said sense data memory at a first rate of speed such that several sense data samples are taken during each of the regular, fixed-length intervals defined by said timing means; and a second sense data conveyance mechanism within said sense and control data conveyance network connecting said sense data memory to said port event processor and conveying said several sense data samples to said port event processor at a second rate of speed slower than said first rate of speed;

whereby said port event processor is supplied with several time-spaced samples of at least some of the sense data for each port each time the port event processor processes the sense data for a port.

4. A switching system as recited in claim 3 which further includes:

a digital filter through which at least some of said sense data samples flow and which averages adjacent sense data samples to reduce the number of sense data samples that are presented to said port event processor each time said port event processor is called upon to process the sense data for a port.

5. A switching system as recited in claim 4 wherein said digital filter has a larger number of data samples presented to it than the number of adjacent samples over which it averages and includes a selection mechanism for selecting a different adjacent subset of the data samples presented at different times, whereby said digital filter is rendered immune from resonance with incoming signal components in said sense data.

6. A switching system as recited in claim 5 wherein:

said digital filter is constructed from a passive logic device having a first set of inputs to which sense data signal samples are presented, a second set of inputs to which are presented a set of signals indicating which adjacent sense data signals to select, a third input, and a binary output at which the average of the selected adjacent sense data values appears;

which digital filter includes a data storage device connecting said binary output to said third input;

whereby said storage device presents to said third input a previously generated average of said selected adjacent sense data values to serve as a tie breaker.

7. A switching system as recited in claim 2 wherein a port data store containing port data is also connected to said sense and control data conveyance network, and wherein said conveyance network conveys port data from said port data store to said port event processor when sense data for a signal port is conveyed to said processor and also conveys port data back from said port event processor to said port data store after the sense data for a port is processed, whereby data for each port is maintained in the port data store and is processed along with sense and control data for each signal port at regular, fixed-length intervals.

8. A switching system as recited in claim 7 which further includes:

a data path for connecting the call control processor to the port data store;

whereby the call control processor may sense or alter the data associated with any port.

9. A switching system as recited in claim 7 which includes:

a sense data memory within said sense and control data conveyance network;

a first sense data conveyance mechanism within said sense and control data conveyance network connecting said signal ports to said sense data memory and conveying at least some sense data samples from each port into said sense data memory at a first rate of speed such that several sense data samples are taken during each of the regular, fixed-length intervals defined by said timing means; and a second sense data conveyance mechanism within said sense and control data conveyance network connecting said sense data memory to said port event processor and conveying said several sense data samples to said port event processor at a second rate of speed slower than said first rate of speed;

whereby said port event processor is supplied with several time-spaced samples of at least some of the sense data for each port each time the port event processor processes the sense data for a port.

10. A switching system as recited in claim 9 which further includes:

a digital filter through which at least some of said sense data samples flow and which averages adjacent sense data samples to reduce the number of sense data samples that are presented to said port event processor each time said port event processor processes the sense data for a port.

11. A switching system as recited in claim 10 wherein said digital filter has a larger number of data samples presented to it than the number of adjacent samples over which it averages and includes a selected mechanism for selecting a different adjacent subset of the data samples presented at different times whereby said digital filter is rendered immune from resonance with incoming signal components in said sense data.

12. A switching system as recited in claim 11 wherein:

said digital filter is constructed from a passive logic device having a first set of inputs to which sense data signal samples are presented, a second set of inputs to which are presented a set of signals indicating which adjacent sense data signals to select, a third input, and a binary output at which the average of the selected adjacent sense data values appears; and which digital filter includes a data storage device connecting said binary output to said third input;

whereby said storage device presents to said third input a previously-generated average of said selected adjacent sense data values to serve as a tie breaker.

13. A switching system as recited in claim 7 wherein said port event processor contains a memory address register and a signal path over which, after having received port data from the port data store, the port event processor transfers at least a portion of said port data into said memory address register, whereby said port data is automatically processed by a series of instructions within said processor's memory selected in accordance with an address that is stored with the port data.

14. A switching system as recited in claim 2 wherein said port event processor includes a set of registers into which port sense data is placed and out of which control data is retrieved by the sense and control data conveyance network.

15. A switching system as recited in claim 14 wherein a port data store containing port data is also connected to said sense and control data conveyance network, and wherein the conveyance network conveys port data from said port data store to said registers when sense data for a signal port is conveyed to said registers and also conveys port data back from said registers to said port data store after the sense data for a port is processed, whereby data for each port is maintained in the port data store and is processed along with sense and control data for each signal port at regular, periodic intervals.

16. A switching system as recited in claim 15 which includes:
   a sense data memory within said sense and control data conveyance network;
   a first sense data conveyance mechanism within said sense and control data conveyance network connecting said signal ports to said sense data memory and conveying at least some sense data samples from each port into said sense data memory at a first rate of speed such that several sense data samples are taken during each of the regular, fixed-length intervals defined by said timing means; and
   a second sense data conveyance mechanism within said sense and control data conveyance network connecting said sense data memory to said port event processor and conveying said several sense data samples to said port event processor at a second rate of speed slower than said first rate of speed;
   whereby said port event processor is supplied with several time-spaced samples of at least some of the sense data for each port each time the port event processor porcesses the sense data for a port.

17. A switching system as recited in claim 16 which further includes:
   a digital filter through which at least some of said sense data samples flow and which averages adjacent sense data samples to reduce the number of sense data samples that are presented to said port event processor each time said port event processor is called upon to process the sense data for a port.

18. A switching system as recited in claim 17 wherein said digital filter has a larger number of data samples presented to it than the number of adjacent samples over which it averages and includes a selection mechanism for selecting a different adjacent subset of the data samples presented at different times, whereby said digital filter is rendered immune from resonance with incoming signal components in said sense data.

19. A switching system as recited in claim 18 wherein:
   said digital filter is constructed from a passive logic device having
   a first set of inputs to which sense data signal samples are presented,
   a second set of inputs to which are presented a set of signals indicating which adjacent sense data signals to select,
   a third input, and
   a binary output at which the average of the selected adjacent sense data values appears; and
   which digital filter includes a data storage device connecting said binary output to said third input;
   whereby said storage device presents to said third input a previously-generated average of said selected adjacent sense data values to serve as a tie breaker.

20. A switching system as recited in claim 15 wherein said port event processor contains a memory address register and a signal path over which, after having received port data from the port data store, the port event processor conveys at least a portion of said port data from said set of registers into said memory address register, thereby initiating the execution of a particular set of instructions.

21. A switching system as recited in claim 14 wherein said registers include at least first and second portions and said port event processor has access to one of said portions while said sense and control data conveyance network has access to at least one other of said portions, and said port event processor further includes:
   switching means connecting to said source of periodic timing signals and responsive to said periodic timing signals for altering the portions of said registers to which said port event processor and said network have access;
   whereby said network may transfer sense data into and control data out of a portion while said port event processor processes sense data in another portion.

22. A switching system as recited in claim 21 wherein said system has a master clock and wherein said sense and control data conveyance network gains access to said one other of said portions of said registers on alternate master clock cycles from when the port event processor gains access to said one portion of said registers, whereby said network and said processor do not interfere with each other or slow each other down but instead interleave their register access actions.

23. A switching system as recited in claim 22 wherein said port event processor includes a pair of processor units sharing a common instruction memory and respectively retrieving instructions from said memory on alternate master clock cycles.

24. A switching system as recited in claim 23 wherein said port event processor contains a memory address register and a signal path over which, after having received port data from the port data store, the port event processor conveys at least a portion of said port data from said set of registers into said memory address register, thereby initiating the execution of a particular set of instructions.

25. A switching system as recited in claim 2 wherein said port event processor includes a pair of processor units, sharing a common instruction memory, and further including:
   a master clock that synchronizes the memory access cycles of the processor units so they respectively retrieve instructions from said instruction memory on alternate master clock cycles, thereby interleaving their instruction memory accesses.

26. A switching system as recited in claim 25 which includes:
   a sense data memory within said sense and control data conveyance network;
   a first sense data conveyance mechanism within said sense and control data conveyance network connecting said signal ports to said sense data memory and conveying at least some sense data samples from each port into said sense data memory at a first rate of speed such that several sense data samples are taken during each of the regular, fixed-length intervals defined by said timing means; and a second sense data conveyance mechanism within said sense and control data conveyance network connecting said sense data memory to said port event processor and conveying said several sense data samples to said port event processor at a second rate of speed slower than said first rate of speed;

whereby said port event processor is supplied with several time-spaced samples of at least some of the sense data for each port each time the port event processor processes the sense data for a port.

27. A switching system as recited in claim 26 which further includes:

a digital filter through which at least some of said sense data samples flow and which averages adjacent sense data samples to reduce the number of sense data samples that are presented to said port event processor each time said port event processor is called upon to process the sense data for a port.

28. A switching system as recited in claim 27 wherein said digital filter has a larger number of data samples presented to it than the number of adjacent samples over which it averages and includes a selection mechanism for selecting a different adjacent subset of the data samples presented at different times, whereby said digital filter is rendered immune from resonance with incoming signal components in said sense data.

29. A switching system as recited in claim 28 wherein:

said digital filter is constructed from a passive logic device having
a first set of inputs to which sense data signals are presented,
a second set of inputs to which are presented a set of signals indicating which adjacent sense data signals to select,
a third input, and
a binary output at which the average of the selected adjacent sense data values appears;
which digital filter includes a data storage device connecting said binary output to said third input;
whereby said storage device presents to said third input a previously-generated average of said selected adjacent sense data values to serve as a tie breaker.

30. A switching system as recited in claim 25 wherein a port data store containing port data is also connected to said sense and control data conveyance network, and wherein said conveyance network conveys port data from said port data store to said pair of processor units when sense data for ports is conveyed to the processor units and also conveys port data back from the processor units to the port data store after sense data for ports is processed, whereby data for each port is maintained in the port data store and is processed along with the sense and control data for each port at regular, fixed-length intervals.

31. A switching system as recited in claim 30 wherein said processor units each contain a memory address register and a signal path over which, after having received port data from the port data store, each processor unit conveys at least a portion of the data from the port data store into the processor unit's memory address register, thereby initiating the execution of a particular set of instructions.

32. A switching system as recited in claim 31 wherein each processor unit includes a set of registers into which port sense data and data from the port data store is placed and out of which control data and data directed to the port data store are retrieved.

33. A switching system as recited in claim 32 wherein the processor units and the sense and control data conveyance network gain access to said set of registers on alternate master clock cycles.

* * * * *